(12) United States Patent
Yoshita

(10) Patent No.: US 10,703,596 B2
(45) Date of Patent: Jul. 7, 2020

(54) MEDIUM CARRYING DEVICE

(71) Applicant: PFU Limited, Ishikawa (JP)

(72) Inventor: Shogo Yoshita, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 113 days.

(21) Appl. No.: 16/180,806

(22) Filed: Nov. 5, 2018

(65) Prior Publication Data

US 2020/0071107 A1     Mar. 5, 2020

(30) Foreign Application Priority Data

Sep. 5, 2018    (JP) .................................. 2018-166288

(51) Int. Cl.
  *B65H 9/06*    (2006.01)
  *B65H 9/00*    (2006.01)
  *B65H 3/06*    (2006.01)

(52) U.S. Cl.
  CPC ............. *B65H 9/06* (2013.01); *B65H 3/0661* (2013.01); *B65H 9/004* (2013.01); *B65H 2404/722* (2013.01); *B65H 2511/242* (2013.01); *B65H 2601/272* (2013.01)

(58) Field of Classification Search
  CPC . B65H 3/56; B65H 3/565; B65H 3/66; B65H 5/36; B65H 9/004; B65H 9/02; B65H 9/04; B65H 9/06; B65H 9/08; B65H 9/101; B65H 2404/693; B65H 2404/72; B65H 2404/725; B65H 2404/7414; B65H 2511/242; B65H 2553/612; B65H 2553/822; B65H 2601/272
  See application file for complete search history.

(56) References Cited

U.S. PATENT DOCUMENTS

| T102,003  I4 | * | 7/1982 | Bullock | ................... | B65H 7/06 |
| | | | | | 271/227 |
| 4,638,989 A | * | 1/1987 | Senoo | ...................... | B65H 7/02 |
| | | | | | 271/227 |
| 5,074,545 A | * | 12/1991 | Handa | ...................... | B65H 7/06 |
| | | | | | 271/227 |
| 8,308,159 B1 | * | 11/2012 | Manor | ................... | B65H 9/004 |
| | | | | | 271/226 |

(Continued)

FOREIGN PATENT DOCUMENTS

| JP | 04-049148 A | 2/1992 |
| JP | 07-089643 A | 4/1995 |
| JP | 09-086726 A | 3/1997 |

*Primary Examiner* — Jeremy R Severson
(74) *Attorney, Agent, or Firm* — McDermott Will & Emery LLP

(57) ABSTRACT

A medium carrying device includes a first stopper, a second stopper, a lever, and a mechanism that, when the lever is positioned in a blocking area, places the first stopper at a first blocking position and places the second stopper at a second blocking position, when the lever is positioned in a opening area, releases the first stopper to be positioned at a first opening position and releases the second stopper to be positioned at a second opening position. When the lever is positioned at a boundary position in between the blocking area and the opening area, a lever portion of the lever gets positioned in between a first stopper portion of the first stopper positioned at the first blocking position and a second stopper portion of the second stopper positioned at the second blocking position.

7 Claims, 21 Drawing Sheets

(56) References Cited

U.S. PATENT DOCUMENTS

| | | | |
|---|---|---|---|
| 8,807,559 B2* | 8/2014 | Osada | B65H 5/062 271/242 |
| 2019/0291981 A1* | 9/2019 | Yoshita | B65H 9/00 |

* cited by examiner

MEDIUM CARRYING DEVICE

CROSS-REFERENCE TO RELATED APPLICATION

The present is based upon and claims the benefit of priority of the prior Japanese Patent Application No. 2018-166288 filed on Sep. 5, 2018, the entire contents of which are incorporated herein by reference.

FIELD

The embodiments discussed herein are related to a medium carrying device.

BACKGROUND

An image reading device is known in which a medium is carried and the image formed on the carried medium is read. In a printer meant for printing on a carried medium; a mechanism is installed by which, when the medium passes obliquely, the obliqueness is corrected (see Japanese Laid-open Patent Publication No. 4-49148, Japanese Laid-open Patent Publication No. 7-89643 and Japanese Laid-open Patent Publication No. 9-86726).

In an image reading device, mediums of various sizes are carried unlike in a printer. Hence, there are times when it is difficult to properly correct the obliqueness of a medium.

SUMMARY

According to an aspect of an embodiment, a medium carrying device includes a carrying unit that constitutes a path for carrying a medium in a carrying direction, a first stopper that is movably supported by the carrying unit so as to be positioned at a first blocking position or a first opening position, a second stopper that is movably supported by the carrying unit so as to be positioned at a second blocking position or a second opening position, a lever that is movably supported by the carrying unit so as to be positioned in a blocking area or an opening area, and a mechanism that, when the lever is positioned in the blocking area, places the first stopper at the first blocking position and places the second stopper at the second blocking position, wherein when the lever is positioned in the opening area, the mechanism releases the first stopper to be positioned at the first opening position and releases the second stopper to be positioned at the second opening position, and when the lever is positioned at a boundary position in between the blocking area and the opening area, a lever portion of the lever that intersects with the path gets positioned in between a first stopper portion of the first stopper, which intersects with the path when the first stopper is positioned at the first blocking position, and a second stopper portion of the second stopper, which intersects with the path when the second stopper is positioned at the second blocking position.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENTS

Figure 1:
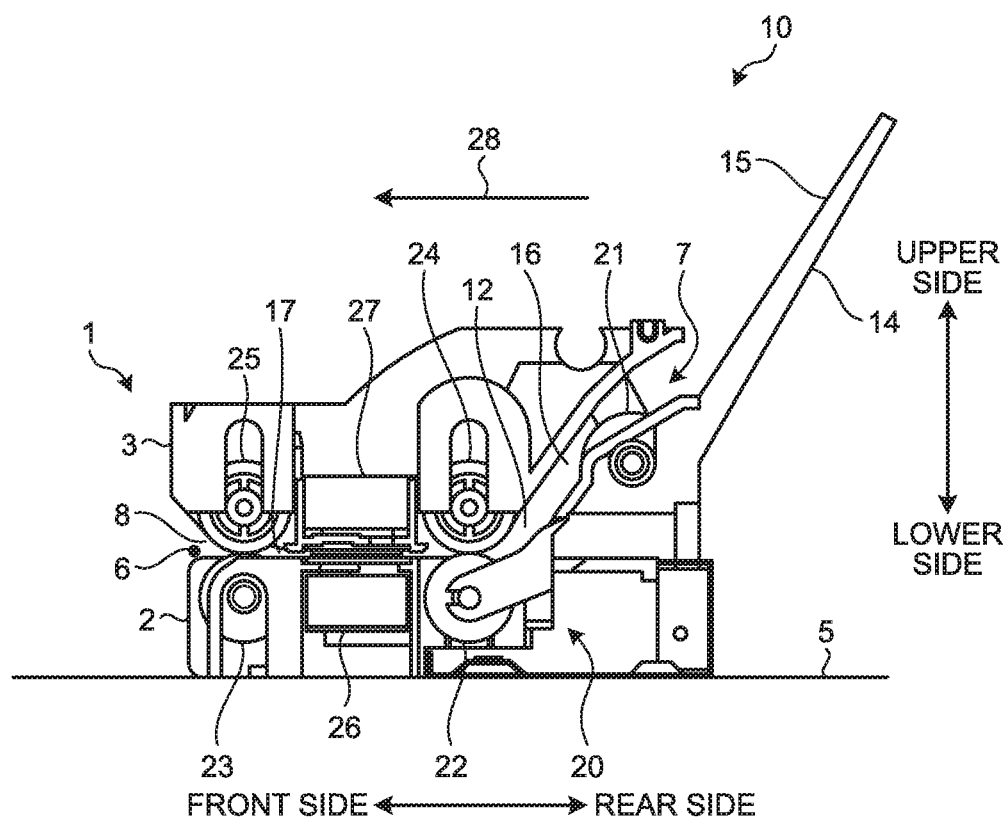
FIG. 1 is a lateral cross-sectional view of a medium carrying device according to a first embodiment.

Preferred embodiments of the disclosure will be explained with reference to accompanying drawings. Exemplary embodiments of a medium carrying device disclosed in the application concerned are described below with reference to the accompanying drawings. However, the disclosed technology is not limited by the embodiments described above. Moreover, in the following explanation, identical constituent elements are referred to by the same reference numerals, and the redundant explanation is not repeated.

First Embodiment

FIG. 1 is a lateral cross-sectional view of a medium carrying device 10 according to a first embodiment. The medium carrying device 10 is disposed in an image reading device, and includes a frame 1 as illustrated in FIG. 1. The frame 1 includes a fixed-side frame 2 and a movable-side frame 3. The fixed-side frame 2 is mounted on an installation surface 5 on which the medium carrying device 10 is installed, and is fixed to the installation surface 5. Herein, the installation surface 5 is formed along the horizontal plane. The movable-side frame 3 is mounted on the top portion of the fixed-side frame 2. The movable-side frame 3 is supported by the fixed-side frame 2 in a rotatable manner around a rotation axis 6, so that the movable-side frame 3 is positioned either in a closed position or in an open position. The rotation axis 6 is parallel to the plane along the installation surface 5.

In the medium carrying device 10; a separation port 7, a paper discharging port 8, and a junction 12 are formed when the movable-side frame 3 is positioned at the closed position. The separation port 7 is formed in the rear side of the medium carrying device 10 and in between the fixed-side frame 2 and the movable-side frame 3. The paper discharging port 8 is formed in the front side of the medium carrying device 10, that is, on the opposite side of the rear side in which the separation port 7 is formed; and is formed in between the fixed-side frame 2 and the movable-side frame 3. The paper discharging port 8 is formed at a lower position closer to the installation surface 5 as compared to the position at which the separation port 7 is formed. The junction 12 is formed in between the fixed-side frame 2 and the movable-side frame 3. The junction 12 is formed in such a way that the distance from the installation surface 5 to the junction 12 is roughly equal to the distance from the installation surface 5 to the paper discharging port 8.

The medium carrying device 10 further includes a pedestal 14 on which a mounting surface 15 is formed. The pedestal 14 is placed in such a way that the mounting surface 15 is oriented obliquely upward, and the angle formed by the plane along the mounting surface 15 with the plane along the installation surface 5 is roughly equal to 55°. Moreover, the pedestal 14 is placed near the separation port 7, so as to ensure that the medium mounted on the mounting surface 15 moves toward the separation port 7 due to gravity; and is fixed to the fixed-side frame 2.

In the medium carrying device 10, a medium separation path 16 and a medium reading path 17 are further formed when the movable-side frame 3 is positioned at the closed position. The medium separation path 16 is formed in between the fixed-side frame 2 and the movable-side frame 3. Moreover, one end of the medium separation path 16 is connected to the separation port 7, and the other end thereof is connected to the junction 12. In the medium separation path 16, the other end that is connected to the junction 12 is on the lower side than the end connected to the separation port 7, so that the medium separation path 16 is inclined with respect to the plane along the installation surface 5. The medium reading path 17 is formed in between the fixed-side frame 2 and the movable-side frame 3. Moreover, one end of the medium reading path 17 is connected to the junction 12, and the other end thereof is connected to the paper discharging port 8. The medium reading path 17 is formed along another plane that is parallel to the plane along the installation surface 5.

The medium carrying device 10 further includes a carrying unit 20 that in turn includes a separating unit 21, a first feed roller 22, a second feed roller 23, a first pressure roller 24, and a second pressure roller 25. The separating unit 21 is formed midway in the medium separation path 16. The separating unit 21 separates, from among a plurality of mediums inserted into the medium separation path 16 from the separation port 7, a single medium that is in contact with the mounting surface 15 of the pedestal 14. Moreover, the separating unit 21 carries the separated single medium from the separation port 7 toward the junction 12 via the medium separation path 16.

The first feed roller 22 is formed in a cylindrical shape. The first feed roller 22 is disposed on the lower side of the medium reading path 17 and is rotatably supported by the fixed-side frame 2. When the first feed roller 22 performs positive rotation (counterclockwise rotation with reference to FIG. 1), the medium that is placed in the medium reading path 17 is carried along a carrying direction 28. Herein, the carrying direction 28 is parallel to the plane along the medium reading path 17; is perpendicular to the rotation axis 6; and is oriented from the junction 12 toward the paper discharging port 8.

The first pressure roller 24 is formed in a cylindrical shape. The first pressure roller 24 is disposed on the upper side of the medium reading path 17 and on the upper side of the first feed roller 22. The first pressure roller 24 is supported, by the movable-side frame 3, to be able to perform translation in the vertical direction, which is perpendicular to the plane along the installation surface 5, and to be able to perform rotation. The first pressure roller 24 presses the medium, which is placed in the medium reading path 17, against the first feed roller 22.

The second feed roller 23 is formed in a cylindrical shape. The second feed roller 23 is disposed in between the first feed roller 22 and the paper discharging port 8 on the lower side of the medium reading path 17, and is rotatably supported by the fixed-side frame 2. When the second feed roller 23 performs positive rotation (counterclockwise rotation with reference to FIG. 1), the medium placed in the medium reading path 17 is carried along the carrying direction 28.

The second pressure roller 25 is formed in a cylindrical manner. The second pressure roller 25 is disposed on the upper side of the medium reading path 17 and on the upper side of the second feed roller 23. The second pressure roller 25 is supported, by the movable-side frame 3, to be able to perform translation in the vertical direction and to be able to perform rotation. The second pressure roller 25 presses the medium, which is placed in the medium reading path 17, against the second feed roller 23.

The image reading device further includes a lower reading unit 26 and an upper reading unit 27. The lower reading unit 26 is disposed on the lower side of the medium reading path 17 and in between the first feed roller 22 and the second feed roller 23. The lower reading unit 26 reads the image that is formed on the under surface of the medium carried in the medium reading path 17. The upper reading unit 27 is disposed on the upper side of the lower reading unit 26 in the upper portion of the medium reading path 17, and is disposed in between the first pressure roller 24 and the second pressure roller 25. The upper reading unit 27 reads the image that is formed on the top surface of the medium carried in the medium reading path 17.

Figure 2:
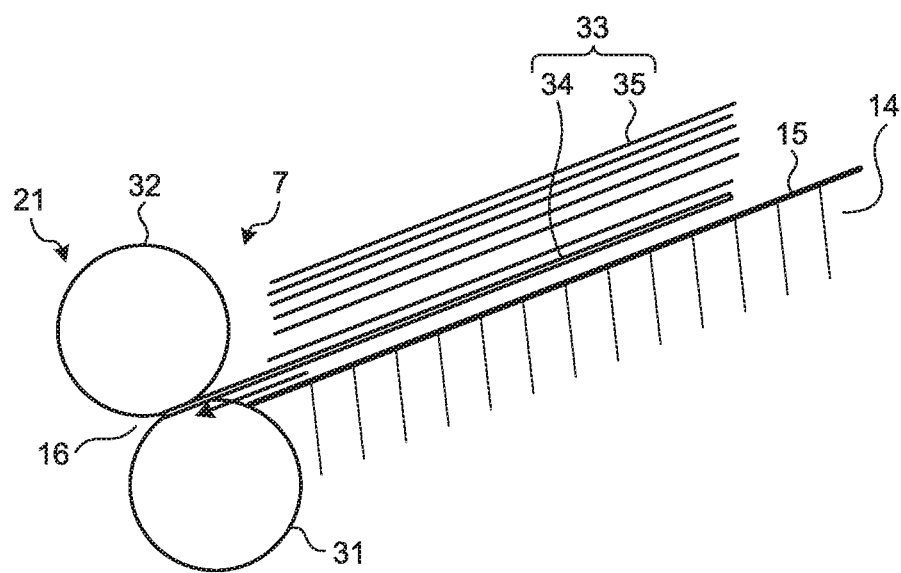
FIG. 2 is a cross-sectional view of a separating unit.

FIG. 2 is a cross-sectional view of the separating unit 21. As illustrated in FIG. 2, the separating unit 21 includes a pick roller 31 and a brake roller 32. The pick roller 31 is disposed on the lower side of the medium separation path 16 and is rotatably supported by the fixed-side frame 2. When the pick roller 31 performs positive rotation (counterclockwise rotation with reference to FIG. 2); a medium 34 that, from among a plurality of mediums 33 inserted into the medium separation path 16 from the separation port 7, is in contact with the mounting surface 15 of the pedestal 14 is carried toward the junction 12. Each medium 33 is made of, for example, a single sheet of paper. The mediums 33 are not bound together, and can be separated from each other.

The brake roller 32 is disposed on the upper side of the medium separation path 16 and on the upper side of the pick roller 31 in an abutting manner with the pick roller 31, and is rotatably supported by the movable-side frame 3. When the pick roller 31 is performing positive rotation but when no medium is sandwiched between the pick roller 31 and the brake roller 32, the brake roller 32 follows the pick roller 31 and performs positive rotation (clockwise rotation with reference to FIG. 2). When the mediums 33 are sandwiched between the pick roller 31 and the brake roller 32, the brake roller 32 performs reverse rotation (counterclockwise rotation with reference to FIG. 2); so that, from among the mediums 33, other mediums 35 other than the medium 34 are carried toward the pedestal 14. While being in contact with the medium 34 that is carried due to the pick roller 31, the brake roller 32 follows the medium 34 and performs positive rotation.

Figure 3:
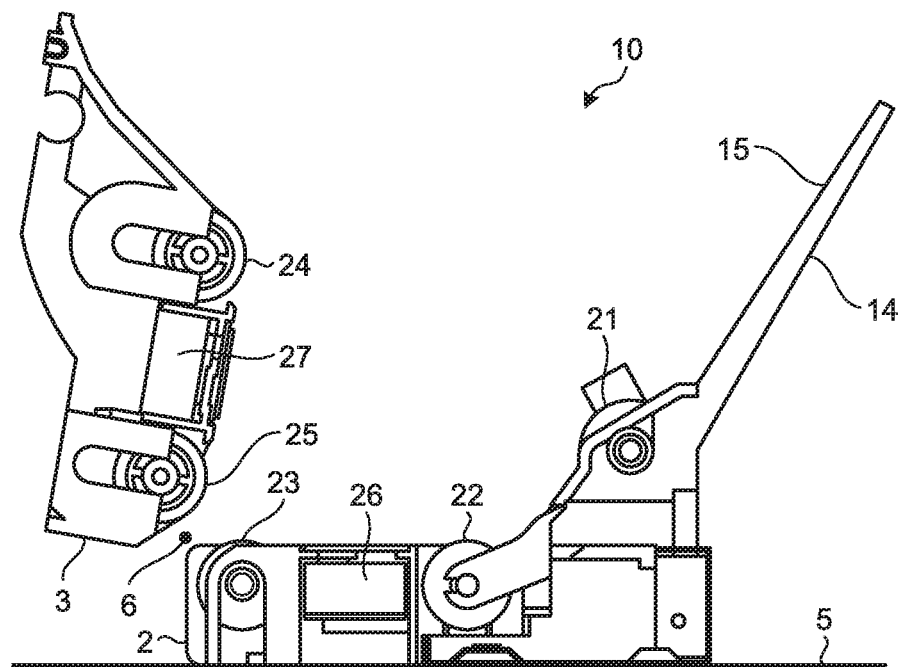
FIG. 3 is a lateral cross-sectional view of the medium carrying device at the time when a movable-side frame is positioned at an open position.

FIG. 3 is a lateral cross-sectional view of the medium carrying device 10 at the time when the movable-side frame 3 is positioned at the open position. Since the movable-side frame 3 is positioned at the open position, the first pressure roller 24 moves away from the first feed roller 22 as illustrated in FIG. 3. Moreover, since the movable-side frame 3 is positioned at the open position, the second pressure roller 25 moves away from the second feed roller 23. Furthermore, since the movable-side frame 3 is positioned at the open position, the brake roller 32 moves away from the pick roller 31. Moreover, since the movable-side frame 3 is positioned at the open position, the medium carried by the carrying unit 20 moves away the first pressure roller 24, the second pressure roller 25, and the brake roller 32; and thus can be easily retrieved from the medium carrying device 10.

Figure 4:
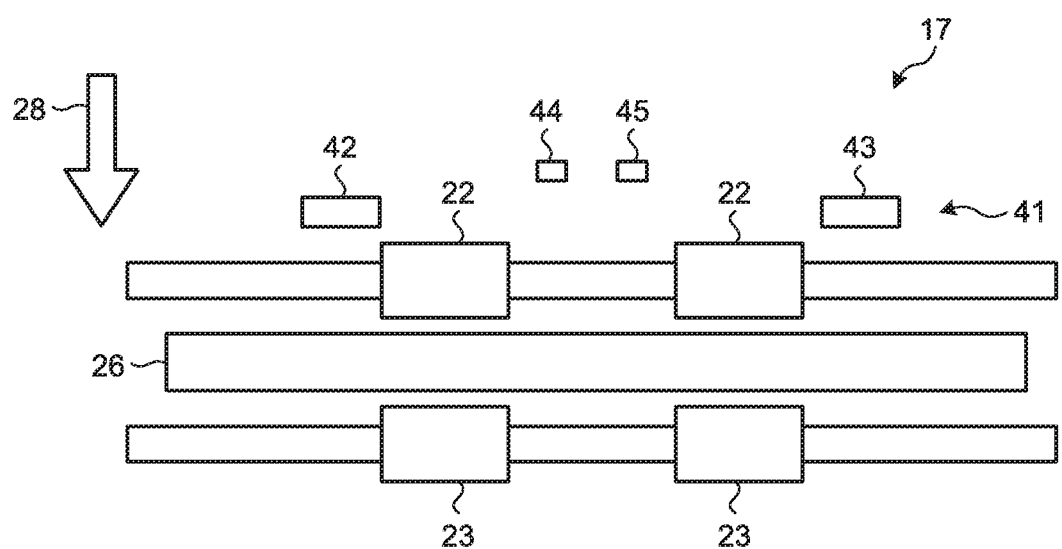
FIG. 4 is a cross-sectional view of an inclination correction mechanism.
Figure 5:
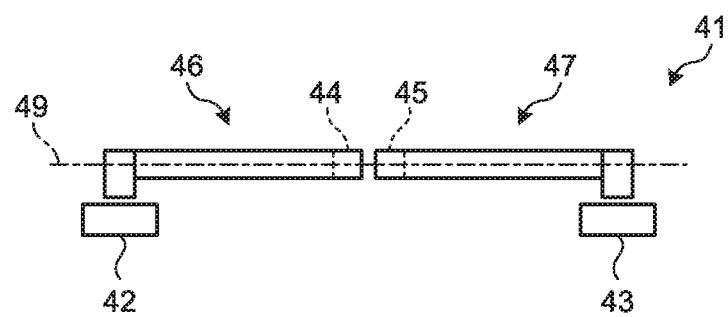
FIG. 5 is a top view of the inclination correction mechanism.

As illustrated in FIG. 4, the medium carrying device 10 further includes an inclination correction mechanism 41. FIG. 4 is a cross-sectional view of the inclination correction mechanism 41. The inclination correction mechanism 41 is disposed in between the first feed roller 22 and the junction 12, and is disposed on the rear side than the first feed roller 22 in the medium reading path 17. The inclination correction mechanism 41 includes a left-side stopper 42, a right-side stopper 43, a left-side lever 44, and a right-side lever 45. The left-side stopper 42 is disposed on the left-side in the medium reading path 17. The right-side stopper 43 is disposed on the right-side of the medium reading path 17. The left-side lever 44 and the right-side lever 45 are disposed in the center portion in the medium reading path 17 and roughly in between the left-side stopper 42 and the right-side stopper 43. Moreover, the left-side lever 44 and the right-side lever 45 are disposed on the side in the opposite direction of the carrying direction 28 as compared to the left-side stopper 42 and the right-side stopper 43. The left-side lever 44 is disposed on the left-side of the right-side lever 45 and in between the left-side stopper 42 and the right-side lever 45. FIG. 5 is a top view of the inclination correction mechanism 41. The inclination correction mechanism 41 further includes a left-side interlocking mechanism 46 and a right-side interlocking mechanism 47.

Figure 6:
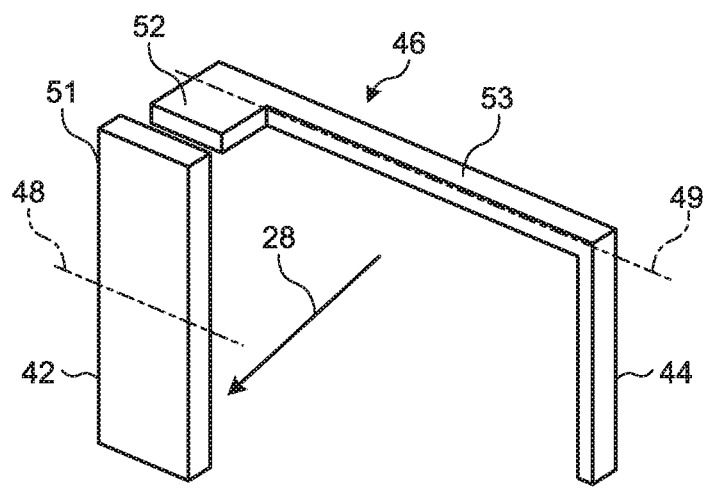
FIG. 6 is a perspective view of a left-side stopper, a left-side lever, and a left-side interlocking mechanism.

FIG. 6 is a perspective view of the left-side stopper 42, the left-side lever 44, and the left-side interlocking mechanism 46. The left-side stopper 42 is formed in a belt-like shape. Moreover, the left-side stopper 42 is supported by the movable-side frame 3 in a rotatable manner around a stopper rotation axis 48, so that the left-side stopper 42 is positioned either at a left-side stopper path blocking position or at a left-side stopper path opening position. The stopper rotation axis 48 is parallel to the rotation axis 6. The left-side lever 44 is formed in a rod-like shape. Moreover, the left-side lever 44 is supported by the movable-side frame 3 in a rotatable manner around a lever rotation axis 49, so that the left-side lever 44 is positioned either in a left-side lever path blocking area or in a left-side lever path opening area. The lever rotation axis 49 is parallel to the stopper rotation axis 48 and is positioned distantly from the stopper rotation axis 48.

The left-side interlocking mechanism 46 includes a stopper-side abutting portion 51, a lever-side abutting portion 52, and a fixing member 53. The stopper-side abutting portion 51 is disposed on the upper side of the left-side stopper 42, and is fixed to the left-side stopper 42. The lever-side abutting portion 52 is disposed near the stopper-side abutting portion 51, and is fixed to the left-side lever 44 via the fixing member 53.

Figure 7:
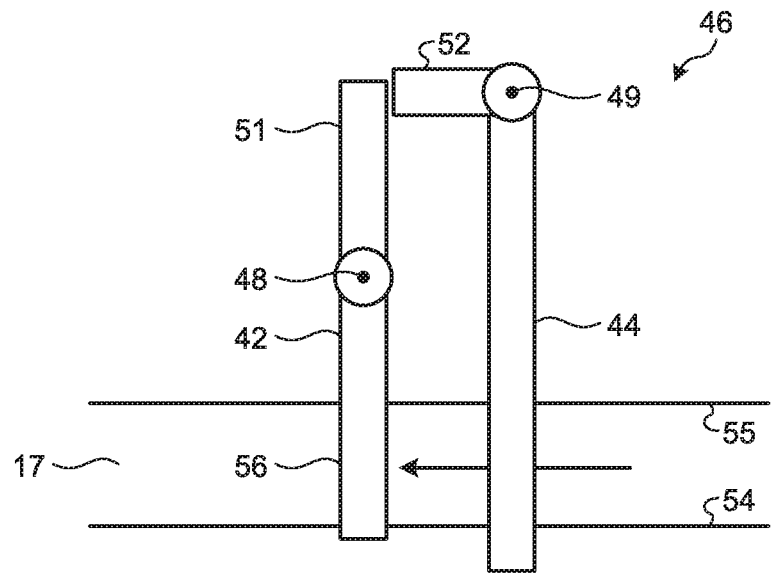
FIG. 7 is a lateral view of the left-side stopper, the left-side lever, and the left-side interlocking mechanism.

FIG. 7 is a lateral view of the left-side stopper 42, the left-side lever 44, and the left-side interlocking mechanism 46. The carrying unit 20 further includes a lower carrying guide 54 and an upper carrying guide 55. The lower carrying guide 54 is formed in a roughly plate-like shape. Moreover, the lower carrying guide 54 is disposed along the plane that is roughly parallel to the installation surface 5, and is fixed to the fixed-side frame 2. The upper carrying guide is formed in a roughly plate-like shape. Moreover, when the movable-side frame 3 is positioned at the closed position, the upper carrying guide 55 is positioned along another plane that is parallel to the plane along the lower carrying guide 54, and is fixed to the movable-side frame 3. That is, the left-side stopper 42, the right-side stopper 43, the left-side lever 44, and the right-side lever 45 are rotatably supported by the upper carrying guide 55. The medium reading path 17 is formed in between the lower carrying guide 54 and the upper carrying guide 55.

When positioned at the left-side stopper path blocking position, the left-side stopper 42 intersects with the plane along the lower carrying guide 54 and with the plane along the upper carrying guide 55. The lower carrying guide 54 has a hole formed therein so as to ensure that, when the left-side stopper 42 rotates around the stopper rotation axis 48, there is no contact between the lower carrying guide 54 and the left-side stopper 42. Similarly, the upper carrying guide 55 has a hole formed therein so as to ensure that, when the left-side stopper 42 rotates around the stopper rotation axis 48, there is no contact between the upper carrying guide 55 and the left-side stopper 42. The left-side stopper 42 includes a left-side stopper portion 56 that, when the left-side stopper 42 is positioned at the left-side stopper path blocking position, overlaps with the medium reading path 17. That is, when the left-side stopper 42 is positioned at the left-side stopper path blocking position, the left-side stopper portion 56 blocks the medium reading path 17 and comes in contact with the medium being carried in the medium reading path 17.

When positioned in the left-side lever path blocking area, the left-side lever 44 intersects with the plane along the lower carrying guide 54 and with the plane along the upper carrying guide 55. That is, when positioned in the left-side lever path blocking area, the left-side lever 44 blocks the medium reading path 17 and comes in contact with the medium being carried in the medium reading path 17. Herein, when positioned in the left-side lever path blocking area, the left-side lever 44 is present on the side in the opposite direction of the carrying direction 28 as compared to the left-side stopper portion 56 of the left-side stopper 42 positioned at the left-side stopper path block position.

The lower carrying guide 54 has another hole formed therein so as to ensure that, when the left-side lever 44 rotates around the lever rotation axis 49, there is no contact between the lower carrying guide 54 and the left-side lever 44. Similarly, the upper carrying guide 55 has another hole formed therein so as to ensure that, when the left-side lever 44 rotates around the lever rotation axis 49, there is no contact between the upper carrying guide 55 and the left-side lever 44.

When the left-side lever 44 is positioned in the left-side lever path blocking area and when the left-side stopper 42 is positioned at the left-side stopper path blocking position, the lever-side abutting portion 52 abuts against the stopper-side abutting portion 51. As a result of the abutment between the lever-side abutting portion 52 and the stopper-side abutting portion 51, the left-side stopper 42 gets fixed to the movable-side frame 3 while being positioned at the left-side stopper path blocking position, and hence does not perform positive rotation (clockwise rotation with reference to FIG. 7) around the stopper rotation axis 48.

Figure 8:
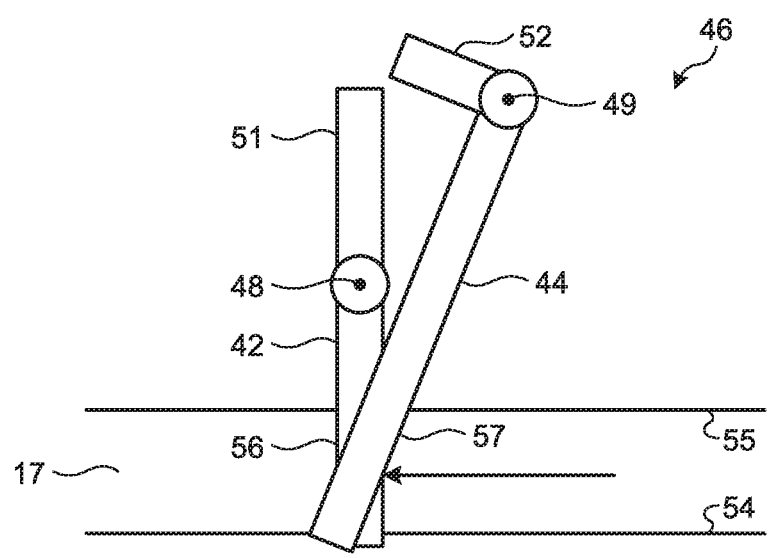
FIG. 8 is a lateral view of the left-side interlocking mechanism at the time when the left-side lever is positioned at a left-side boundary position.

As a result of performing positive rotation (clockwise rotation with reference to FIG. 7) around the lever rotation axis 49, the left-side lever 44 moves from the left-side lever path blocking area into the left-side lever path opening area. As illustrated in FIG. 8, at the time of moving from the left-side lever path blocking area into the left-side lever path opening area, the left-side lever 44 passes through a left-side boundary position. FIG. 8 is a lateral view of the left-side interlocking mechanism 46 at the time when the left-side lever 44 is positioned at the left-side boundary position. The lever-side abutting portion 52 is disposed in such a way that, when the left-side lever 44 is positioned at the left-side boundary position, the lever-side abutting portion 52 does not abut against the stopper-side abutting portion 51. When the left-side lever 44 is positioned at the left-side boundary position, since the lever-side abutting portion 52 does not abut against the stopper-side abutting portion 51, the left-side stopper 42 is released to be able to perform positive rotation from the left-side stopper path blocking position.

The left-side lever 44 includes a left-side lever portion 57. When the left-side lever 44 is positioned at the left-side boundary position, the left-side lever portion 57 overlaps with the medium reading path 17. When the left-side lever 44 is positioned at the left-side boundary position, the position of the left-side lever portion 57 along the carrying direction 28 is roughly identical to the position of the left-side stopper portion 56 along the carrying direction 28 when the left-side stopper 42 is positioned at the left-side stopper path blocking position. That is, when the left-side lever 44 is positioned at the left-side boundary position, the line segment formed by orthogonal projection of the left-side lever portion 57 onto a straight line parallel to the carrying direction 28 overlaps with the line segment formed by orthogonal projection of the left-side stopper portion 56 onto the same straight line when the left-side stopper 42 is positioned at the left-side stopper path blocking position.

Figure 9:
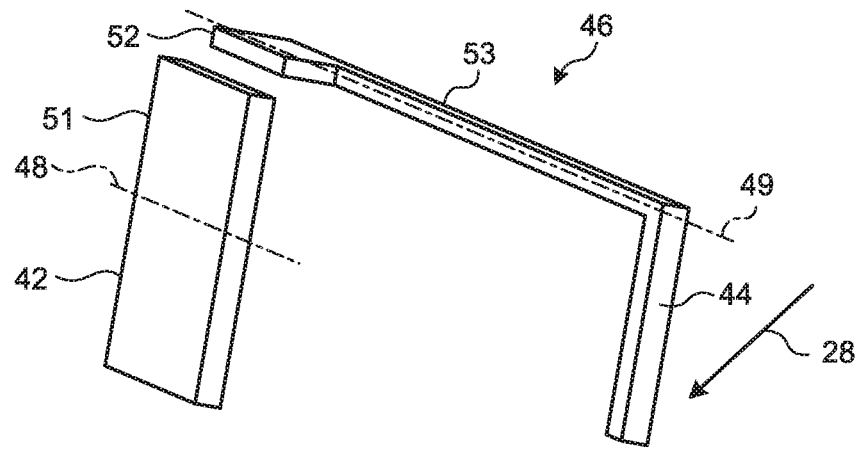
FIG. 9 is a perspective view of the left-side interlocking mechanism at the time when the left-side lever is positioned in a left-side lever path opening area and the left-side stopper is positioned at a left-side stopper path opening position.

The left-side lever 44 further performs positive rotation and moves from the left-side boundary position into the left-side lever path opening area. FIG. 9 is a perspective view of the left-side interlocking mechanism 46 at the time when the left-side lever 44 is positioned in the left-side lever path opening area and the left-side stopper 42 is positioned at the left-side stopper path opening position. When the left-side lever 44 is positioned in the left-side lever path opening area, in an identical manner to the state in which the left-side lever 44 is positioned at the left-side boundary position, the lever-side abutting portion 52 is disposed not to abut against the stopper-side abutting portion 51. Hence, when the left-side lever 44 is positioned in the left-side lever path opening area, the left-side stopper 42 is released to be able to perform positive rotation from the left-side stopper path blocking position.

Figure 10:
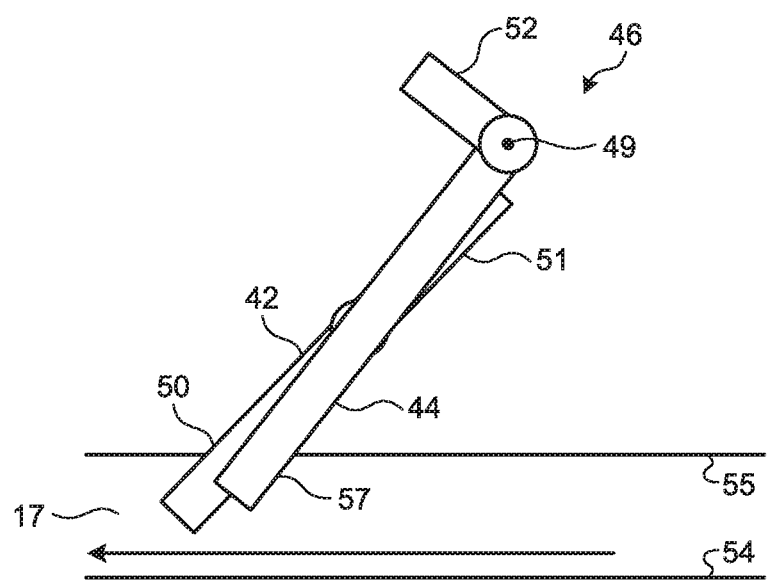
FIG. 10 is a lateral view of the left-side interlocking mechanism at the time when the left-side lever is positioned in the left-side lever path opening area and the left-side stopper is positioned at the left-side stopper path opening position.

As a result of performing positive rotation from the left-side stopper path blocking position, the left-side stopper 42 gets positioned at the left-side stopper path opening position as illustrated in FIG. 10. FIG. 10 is a lateral view of the left-side interlocking mechanism 46 at the time when the left-side lever 44 is positioned in the left-side lever path opening area and the left-side stopper 42 is positioned at the left-side stopper path opening position. As a result of being positioned in the left-side lever path opening area, the left-side lever 44 gets disposed on the upper side than the lower carrying guide 54 so as not to intersect with the plane along the lower carrying guide 54. When the left-side lever 44 is positioned in the left-side lever path opening area, the medium reading path 17 gets partially opened so that the mediums can be carried.

When the left-side lever 44 is positioned in the left-side lever path opening area, the left-side stopper 42 is released to be movable and thus can be positioned at the left-side stopper path opening position. When the left-side stopper 42 is positioned at the left-side stopper path opening position, the left-side stopper portion 56 opens the medium reading path 17 for carrying the mediums.

The right-side stopper 43 is configured in an identical manner to the left-side stopper 42. That is, the right-side stopper 43 is fixed to the movable-side frame 3 in a rotatable manner around the stopper rotation axis 48, so that the right-side stopper 43 is positioned either at a right-side stopper path blocking position or at a right-side stopper path opening position. The right-side stopper 43 includes a right-side stopper portion that, when the right-side stopper 43 is positioned at the right-side stopper path blocking position, overlaps with the medium reading path 17. When the right-side stopper 43 is positioned at the right-side stopper path blocking position, the right-side stopper portion blocks the medium reading path 17. On the other hand, when the right-side stopper 43 is positioned at the right-side stopper path opening position, the right-side stopper portion opens the medium reading path 17. When the right-side stopper 43 is positioned at the right-side stopper path blocking position, the position of the right-side stopper portion along the carrying direction 28 is roughly identical to the position of the left-side stopper portion 56 along the carrying direction 28 at the time when the left-side stopper 42 is positioned at the left-side stopper path blocking position.

The right-side lever 45 is configured in an identical manner to the left-side lever 44. That is, the right-side lever 45 is supported by the movable-side frame 3 in a rotatable manner around the lever rotating shift 49, so that the right-side lever 45 is positioned either in a right-side lever path blocking area or in a right-side lever path opening area. The right-side lever 45 includes a right-side lever portion that, when the right-side lever 45 is positioned in the right-side lever path blocking area, overlaps with the medium reading path 17. When the right-side lever 45 is positioned in the right-side lever path blocking area, the right-side lever portion blocks the medium reading path 17. On the other hand, when the right-side lever 45 is positioned in the right-side lever path opening area, the right-side lever portion opens the medium reading path 17. When the right-side lever 45 is positioned in the right-side lever path blocking area, the position of the right-side lever portion along the carrying direction 28 is roughly identical to the position of the left-side lever portion 57 along the carrying direction 28 when the left-side lever 44 is positioned in the left-side lever path blocking area.

The right-side interlocking mechanism 47 is configured in an identical manner to the left-side interlocking mechanism 46. When the right-side lever 45 is positioned in the right-side lever path blocking area, the right-side interlocking mechanism is fixed to the movable-side frame 3 while the right-side stopper 43 is positioned at the right-side stopper path blocking position. When the right-side lever 45 is positioned at a right-side boundary position or in the right-side lever path opening area, the right-side interlocking mechanism 47 releases the right-side stopper 43 to be able to be positioned at the right-side stopper path opening position.

When the medium carrying device 10 is mounted on the installation surface 5, the left-side stopper 42 performs reverse rotation toward the left-side stopper path blocking position due to its own weight, and gets positioned at the left-side stopper path blocking position. When the left-side stopper 42 is positioned at the left-side stopper path blocking position, the left-side lever 44 performs reverse rotation toward the left-side lever path blocking area due to its own rotation, and gets positioned in the left-side lever path blocking area. Moreover, the right-side stopper 43 performs reverse rotation toward the right-side stopper path blocking position, and gets positioned at the right-side stopper path blocking position. When the right-side stopper 43 is positioned at the right-side stopper path blocking position, the right-side lever 45 performs reverse rotation toward the right-side lever path blocking area due to its own weight, and gets positioned in the right-side lever path blocking area.

Hence, in the initial state in which the medium 34 is not being carried in the medium reading path 17, the left-side stopper 42 is positioned at the right-side stopper path blocking position. Moreover, in the initial state, the right-side stopper 43 is positioned at the right-side stopper path blocking position. Furthermore, in the initial state, the left-side lever 44 is positioned in the left-side lever path blocking area. Moreover, in the initial state, the right-side lever 45 is positioned in the right-side lever path blocking area.

When the left-side lever 44 is positioned at the left-side boundary position, the left-side lever portion 57 is positioned in between the left-side stopper 42 and the right-side stopper 43 in the initial state. When the right-side lever 45 is positioned in the right-side boundary position, the right-side lever portion is positioned in between the left-side stopper 42 and the right-side stopper 43 in the initial state.

Operations of Medium Carrying Device 10

When the images formed on the mediums 33 are to be read using the image reading device in which the medium carrying device 10 is installed, the user places the mediums 33 on the pedestal 14. Upon being placed on the pedestal, the mediums 33 get inserted into the separation port 7 due to gravity and come in contact with the separating unit 21.

After the mediums 33 are placed on the pedestal 14, the user performs a predetermined operation in the medium carrying device 10. When the predetermined operation is performed in the medium carrying device 10, the carrying unit 20 makes the pick roller 31, the first feed roller 22, and the second feed roller 23 perform positive rotation; and makes the brake roller 32 perform reverse rotation. As a result of the positive rotation of the pick roller 31, the separating unit 21 carries the medium 34, which represents the medium in contact with the pedestal 14 from among the mediums 33, toward the junction 12. Moreover, as a result of the reverse rotation of the brake roller 32, the separating unit 21 separates the mediums 33 into the medium 34 and the mediums 35 so that the mediums 35 are not carried to the junction 12. The medium 34 gets carried into the medium reading path 17 by the separating unit 21.

When the medium 34 is carried into the medium reading path 17, it passes through the inclination correction mechanism 41. After passing through the inclination correction mechanism 41, the medium 34 gets sandwiched between the first feed roller 22 and the first pressure roller 24 and gets pressed against the first feed roller 22 due to the first pressure roller 24. When the first feed roller 22 performs positive rotation, the medium 34 is carried along the carrying direction 28 via the medium reading path 17. While the medium 34 is being carried in the medium reading path 17, the lower reading unit 26 reads the image formed on the under surface of the medium 34, and the upper reading unit 27 reads the image formed on the top surface of the medium 34. After the medium 34 passes in between the lower reading unit 26 and the upper reading unit 27, the medium 34 gets sandwiched in between the second feed roller 23 and the second pressure roller 25, and gets pressed against the second feed roller 23 due to the second pressure roller 25. When the second feed roller 23 performs positive rotation, the medium 34 is carried along the carrying direction 28 via the medium reading path 17, and is then discharged from the paper discharging port 8.

Figure 11:
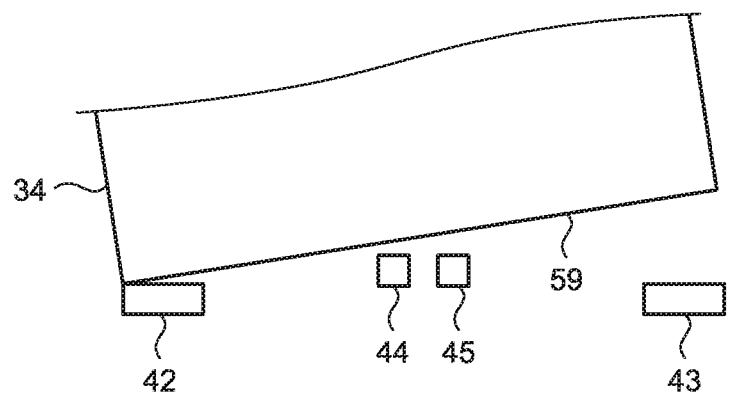
FIG. 11 is a planar view of a medium abutting against the left-side stopper of the inclination correction mechanism.

While passing through the inclination correction mechanism 41, there are times when the medium 34 passes obliquely in the medium reading path 17 and abuts against the left-side stopper 42 of the inclination correction mechanism 41 as illustrated in FIG. 11. FIG. 11 is a planar view of the medium 34 abutting against the left-side stopper 42 of the inclination correction mechanism 41. After abutting against the left-side stopper 42, the medium 34 gets carried to the separating unit 21 and becomes warped, and a leading end 59 of the medium 34 rotates roughly around the left-side stopper 42 so that the portion of the leading end 59 which is not abutting against the left-side stopper 42 moves along the carrying direction 28.

Figure 12:
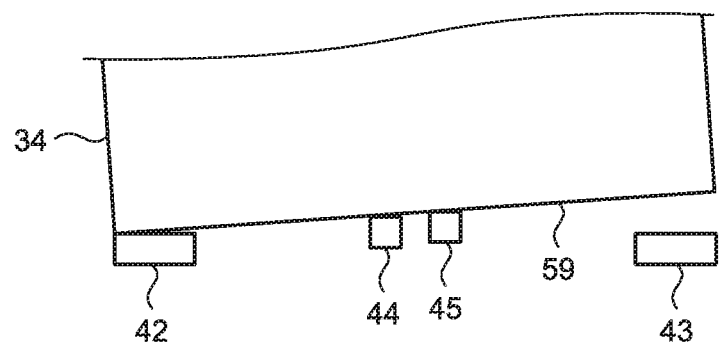
FIG. 12 is a planar view of the medium abutting against the left-side lever and a right-side lever of the inclination correction mechanism.

When the leading end 59 rotates, the medium 34 further abuts against the left-side lever 44 and the right-side lever 45 as illustrated in FIG. 12. FIG. 12 is a planar view of the medium 34 abutting against the left-side lever 44 and the right-side lever 45 of the inclination correction mechanism 41. As a result of being abutted by the medium 34, the left-side lever 44 moves from the left-side stopper path blocking area into a left-side boundary area. Moreover, as a result of being abutted by the medium 34, the right-side lever 45 moves from the right-side stopper path blocking area into a right-side boundary area.

Figure 13:
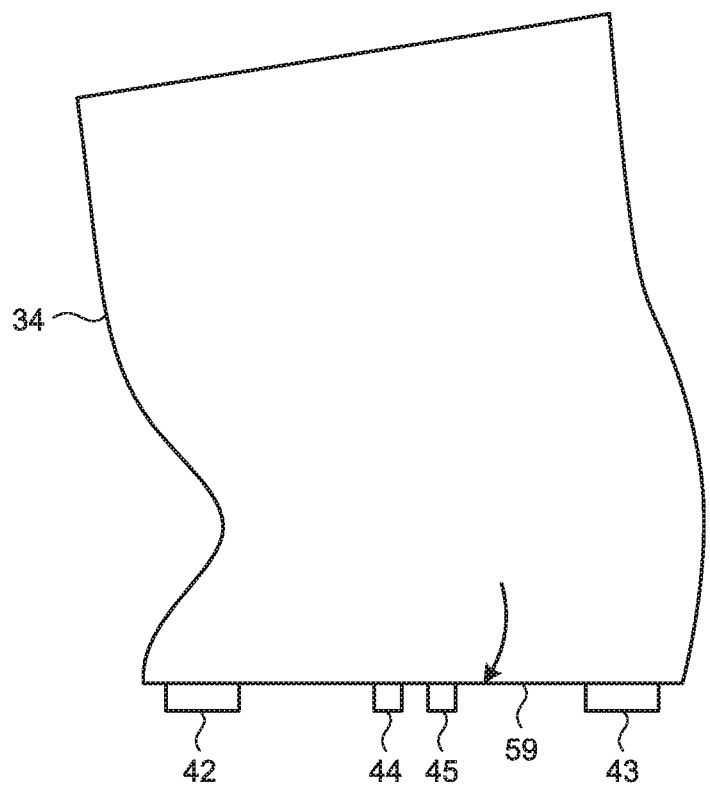
FIG. 13 is a planar view of the medium that becomes warped because of abutting against a right-side stopper.
Figure 14:
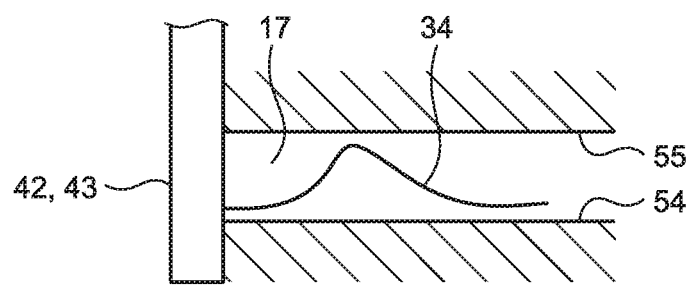
FIG. 14 is a lateral view of the medium that becomes warped because of abutting against the right-side stopper.

After abutting against the left-side lever 44 and the right-side lever 45, the medium 34 is carried to the separating unit 21 and, as illustrated in FIG. 13, becomes further warped and the leading end 59 thereof abuts against the right-side stopper 43. FIG. 13 is a planar view of the medium 34 that becomes warped because of abutting against the left-side stopper 42. Because of the warping, the width in the vertical direction of the medium 34 increases as illustrated in FIG. 14. FIG. 14 is a lateral view of the medium 34 that becomes warped because of abutting against the left-side stopper 42. That is, the lower carrying guide 54 and the upper carrying guide 55 are disposed in such a way that the width in the vertical direction of the medium reading path 17 is greater than a predetermined length so as to enable warping of the medium 34.

Figure 15:
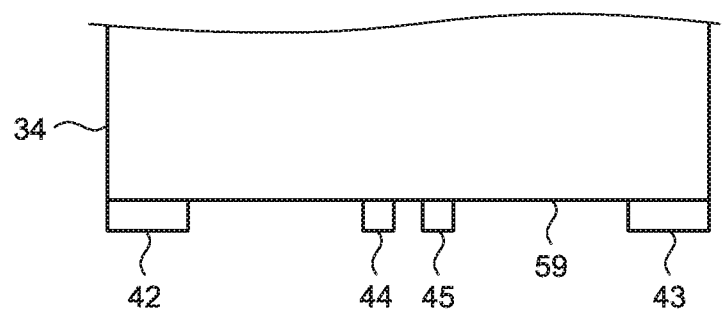
FIG. 15 is a planar view of the medium abutting against the left-side stopper and the right-side stopper of the inclination correction mechanism.

FIG. 15 is a planar view of the medium 34 abutting against the left-side stopper 42 and the right-side stopper 43 of the inclination correction mechanism 41. As a result of the abutment of the medium 34 with the left-side stopper 42 as well as the right-side stopper 43, the left-side lever 44 gets positioned in the left-side boundary area. Since the left-side lever 44 gets positioned in the left-side boundary area, the left-side interlocking mechanism 46 releases the left-side stopper 42 to be positioned at the left-side stopper path opening position. Since the medium 34 abuts against the left-side stopper 42 and the right-side stopper 43, the right-side lever 45 gets positioned in the right-side boundary area. Since the right-side lever 45 gets positioned in the right-side boundary area, the right-side interlocking mechanism 47 releases the right-side stopper 43 to be positioned at the right-side stopper path opening position.

In the released state of the left-side stopper 42, because of the abutment by the medium 34, the left-side stopper 42 performs positive rotation and gets positioned at the left-side stopper path opening position. Similarly, in the released state of the right-side stopper 43, because of the abutment by the medium 34, the right-side stopper 43 gets positioned at the right-side stopper path opening position. When the left-side stopper 42 is positioned at the left-side stopper path opening position and when the right-side stopper 43 is positioned at the right-side stopper path opening position, the medium 34 gets carried in the medium reading path 17, with the leading end 59 remaining along the plane perpendicular to the carrying direction 28. Hence, in the state in which the straight line along the leading end 59 is perpendicular to the carrying direction 28, the medium 34 reaches the first feed roller 22.

Meanwhile, even if the medium 34 abuts against the right-side stopper 43 before abutting against the left-side stopper 42, the inclination correction mechanism 41 can correct the inclination of the medium 34 in an identical manner. Moreover, even if the medium 34 abuts against the left-side lever 44 or the right-side lever 45 before abutting against the left-side stopper 42, the inclination correction mechanism 41 can correct the inclination of the medium 34 in an identical manner.

Figure 16:
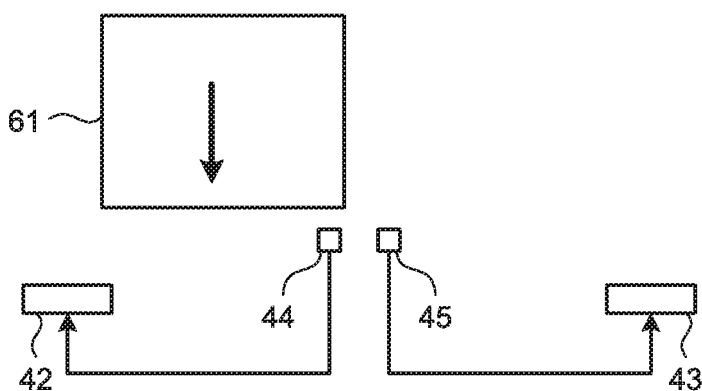
FIG. 16 is a planar view of the inclination correction mechanism when a narrow medium is carried.

In the medium carrying device 10, there are times when a medium 61 having a smaller width than the width of the medium 34 is carried as illustrated in FIG. 16. FIG. 16 is a planar view of the inclination correction mechanism 41 when the narrow medium 61 is carried. The medium 61 is formed in such a way that, while being carried in the medium reading path 17, it abuts against the left-side stopper 42 and the left-side lever 44 but does not abut against the right-side stopper 43 and the right-side lever 45. When carried in the medium reading path 17, the medium 61 moves the left-side lever 44 to the left-side boundary position. Since the left-side lever 44 gets positioned at the left-side boundary position, the left-side stopper 42 gets released.

Figure 17:
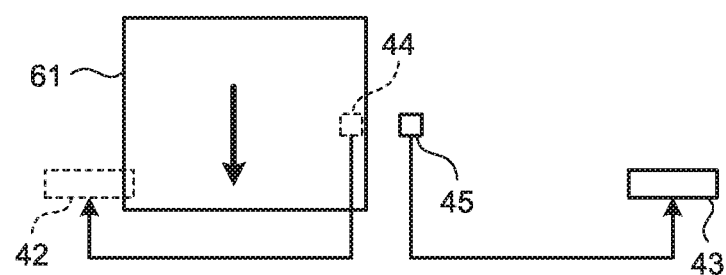
FIG. 17 is another planar view of the inclination correction mechanism at the time when the narrow medium is carried.

When the medium 61 is carried in the medium reading path 17 while the left-side stopper 42 is released, the left-side lever 44 gets positioned in the left-side stopper path releasing area and the left-side stopper 42 gets positioned at the left-side stopper path opening position as illustrated in FIG. 17. FIG. 17 is another planar view of the inclination correction mechanism 41 at the time when the narrow medium 61 is carried. When the left-side stopper 42 is positioned at the left-side stopper path opening position, the medium 61 can be properly carried in the medium reading path 17 along the carrying direction 28 without any occurrence of paper jam in the inclination correction mechanism 41.

Effects of Medium Carrying Device 10

The medium carrying device 10 according to the first embodiment includes the lower carrying guide 54, the upper carrying guide 55, the left-side stopper 42, the right-side stopper 43, the left-side lever 44, the right-side lever 45, the left-side interlocking mechanism 46, and the right-side interlocking mechanism 47. The lower carrying guide 54 and the upper carrying guide 55 constitute the medium reading path 17 that is used for carrying the mediums along the carrying direction 28. The left-side stopper 42 is movably supported by the upper carrying guide 55 so as to be positioned either at the left-side stopper path blocking position or at the left-side stopper path opening position. The right-side stopper 43 is movably supported by the upper carrying guide 55 so as to be positioned either at the right-side stopper path blocking position or at the right-side stopper path blocking position. The left-side lever 44 is movably supported by the upper carrying guide 55 so as to be positioned either in the left-side lever path blocking area or in the left-side lever path opening area. The right-side lever 45 is movably supported by the upper carrying guide 55 so as to be positioned either in the right-side lever path blocking area or in the right-side lever path opening area.

When the left-side lever 44 is positioned in the left-side lever path blocking area, the left-side stopper 42 is fixed at the left-side stopper path blocking position due to the left-side interlocking mechanism 46. Moreover, when the left-side lever 44 is positioned in the left-side lever path opening area, the left-side stopper 42 is released to be positioned at the left-side stopper path opening position due to the left-side interlocking mechanism 46. When the right-side lever 45 is positioned in the right-side lever path blocking area, the right-side stopper 43 is positioned at the right-side stopper path blocking position due to the right-side interlocking mechanism 47. Moreover, when the right-side lever 45 is positioned in the right-side lever path opening area, the right-side stopper 43 is released to be positioned at the right-side path opening position due to the right-side interlocking mechanism 47. The left-side lever portion 57 of the left-side lever 44 and the right-side lever portion of the right-side lever 45 are positioned in between the left-side stopper portion 56 of the left-side stopper 42 and the right-side stopper portion of the right-side stopper 43.

With such a configuration, the medium carrying device 10 becomes able to correct the inclination of the medium 34. In an image reading device, there are times when the narrow medium 61, which abuts against only either the left-side stopper 42 or the right-side stopper 43, is carried unlike in a printer. In the medium carrying device 10, even when the narrow medium 61 is carried, since it abuts against the left-side lever 44 and the right-side lever 45, the left-side stopper 42 and the right-side stopper 43 can be released. For that reason, in the medium carrying device 10, paper jam can be prevented from occurring and the medium can be properly carried.

Second Embodiment

Figure 18:
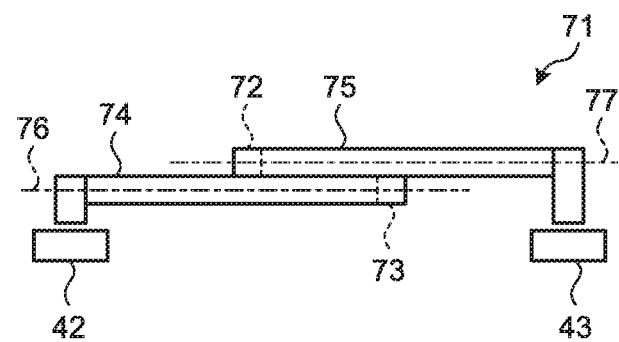
FIG. 18 is a planar view of an inclination correction mechanism of a medium carrying device according to a second embodiment.

In the medium carrying device 10 according to the first embodiment, the left-side lever 44 that is meant for releasing the left-side stopper 42 is disposed on the left-hand side of the right-side lever 45 that is meant for releasing the right-side stopper 43. Alternatively, the left-side lever 44 can be disposed on the right-side of the right-side lever 45. In a medium carrying device according to a second embodiment, as illustrated in FIG. 18, a different inclination correction mechanism 71 is substituted for the inclination correction mechanism 41 of the medium carrying device 10 according to the first embodiment. FIG. 18 is a planar view of the inclination correction mechanism 71 of the medium carrying device according to the second embodiment. In the inclination correction mechanism 71; a left-side lever 72, a right-side lever 73, a left-side interlocking mechanism 74, and a right-side interlocking mechanism 75 are substituted for the left-side lever 44, the right-side lever 45, the left-side interlocking mechanism 46, and the right-side interlocking mechanism 47, respectively, of the inclination correction mechanism 41. The remaining portion is identical to the inclination correction mechanism 41.

The left-side lever 72 and the right-side lever 73 are disposed in the center portion of the medium reading path 17, and are roughly disposed in between the left-side stopper 42 and the right-side stopper 43. The left-side lever 72 is supported by the upper carrying guide 55 in a rotatable manner around a left-side lever rotation axis 77, so that the left-side lever 72 is positioned either in the left-side lever path blocking area or in the left-side lever path opening area. The left-side lever rotation axis 77 is parallel to the stopper rotation axis 48 and is positioned distantly from the stopper rotation axis 48. When positioned in the left-side lever path blocking area, the left-side lever 72 blocks the medium reading path 17. On the other hand, when positioned in the left-side lever path opening area, the left-side lever 72 opens the medium reading path 17.

The right-side lever 73 is roughly disposed in between the right-side stopper 43 and the left-side lever 72. Moreover, the right-side lever 73 is supported by the upper carrying guide 55 in a rotatable manner around a right-side lever rotation axis 76, so that the right-side lever 73 is positioned either in the right-side lever path blocking area or in the right-side lever path opening area. The right-side lever rotation axis 76 is parallel to the left-side lever rotation axis 77 and is positioned distantly from the left-side lever rotation axis 77 and the stopper rotation axis 48. When positioned in the right-side lever path blocking area, the right-side lever 73 blocks the medium reading path 17. On the other hand, when positioned in the right-side lever path opening area, the right-side lever 73 opens the medium reading path 17.

When the right-side lever 73 is positioned in the right-side lever path blocking area, the left-side stopper 42 is fixed at the left-side stopper path blocking position due to the left-side interlocking mechanism 74. On the other hand, when the right-side lever 73 is positioned in the right-side lever path opening area, the left-side stopper 42 is released to be able to be positioned at the left-side stopper path opening position due to the left-side interlocking mechanism 74. When the left-side lever 72 is positioned in the left-side path blocking area, the right-side stopper 43 is fixed at the right-side stopper path blocking position due to the right-side interlocking mechanism 75. On the other hand, when the left-side lever 72 is positioned in the left-side lever path opening area, the right-side stopper 43 is released to be able to be positioned at the right-side stopper path opening position due to the right-side interlocking mechanism 75.

In an identical manner to the inclination correction mechanism 41 of the medium carrying device 10 according to the first embodiment, the inclination correction mechanism 71 releases the left-side stopper 42 and the right-side stopper 43 when the medium carried in the medium reading path 17 abuts against the left-side lever 72 and the right-side lever 73. As a result of properly fixing and releasing the left-side stopper 42 and the right-side stopper 43, the inclination correction mechanism 71 can correct the medium that is passing obliquely in the medium reading path 17.

Figure 19:
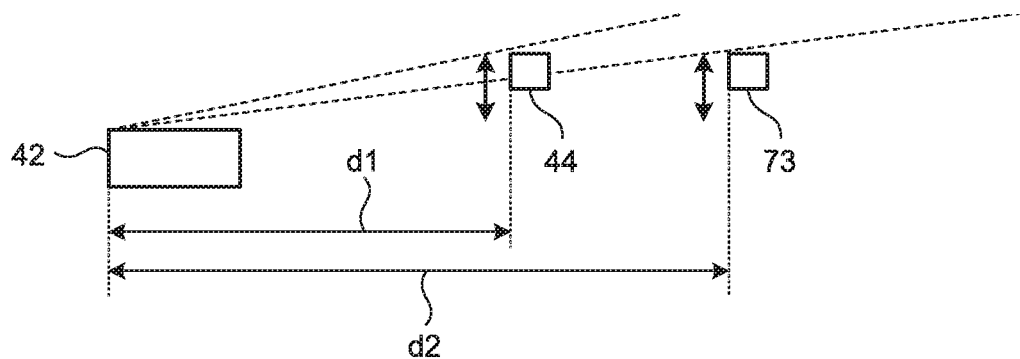
FIG. 19 is a planar view of a right-side lever of the medium carrying device according to the second embodiment and the left-side lever of the medium carrying device according to the first embodiment.

FIG. 19 is a planar view of the right-side lever 73 of the medium carrying device according to the second embodiment and the left-side lever 44 of the medium carrying device 10 according to the first embodiment. A distance d2 between the right-side lever 73 and the left-side stopper 42 is longer than a distance d1 between the left-side lever 44 and the left-side stopper 42 in the medium carrying device 10 according to the first embodiment. Hence, as compared to the inclination correction mechanism 41 of the medium carrying device 10 according to the first embodiment, the inclination correction mechanism 71 enables achieving reduction in the misalignment of the orientation of the leading end of the post-correction medium as attributed to the manufacturing error, and thus can correct the obliquely-passing medium with a high degree of accuracy.

Figure 20:
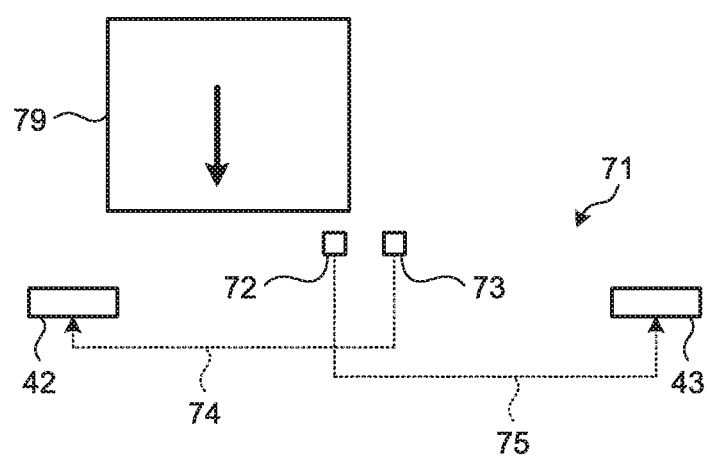
FIG. 20 is a planar view of the inclination correction mechanism at the time when a narrow medium is carried.

FIG. 20 is a planar view of the inclination correction mechanism 71 at the time when a narrow medium 79 is carried. The medium 79 is formed in such a way that, while being carried in the medium reading path 17, it abuts against the left-side stopper 42 and the left-side lever 72 but does not abut against the right-side stopper 43 and the right-side lever 73. At that time, as a result of being carried in the medium reading path 17, the medium 61 moves the left-side lever 72 to the left-side boundary position. Since the left-side lever 72 gets positioned at the left-side boundary position, the right-side stopper 43 gets released.

Figure 21:
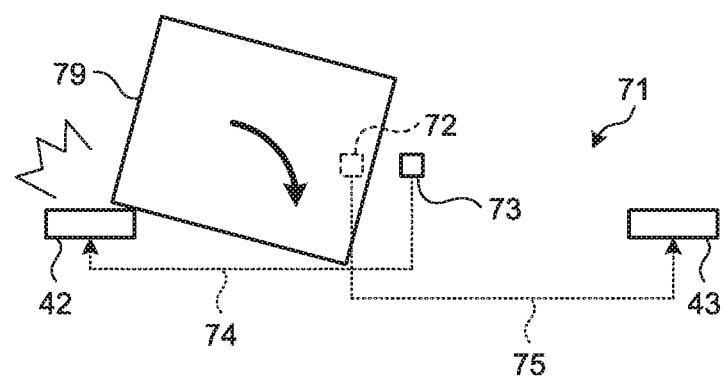
FIG. 21 is another planar view of the inclination correction mechanism at the time when the narrow medium is carried.

The right-side lever 73 remains positioned in the right-side lever path blocking area so as to ensure that there is no abutment from the medium 79. Since the right-side lever 73 remains positioned in the right-side lever path blocking area, the left-side stopper 42 remains fixed at the left-side stopper path blocking position. FIG. 21 is another planar view of the inclination correction mechanism 71 at the time when the narrow medium 79 is carried. Since the left-side stopper 42 is fixed at the left-side stopper path blocking position, the medium 79 may abut against the left-side stopper 42 while being carried in the medium reading path 17; and thus paper jam may occur. Hence, as compared to the medium carrying device according to the second embodiment, in the medium carrying device 10 according to the first embodiment, paper jam can be more prevented from occurring and the mediums can be more properly carried.

Third Embodiment

Figure 22:
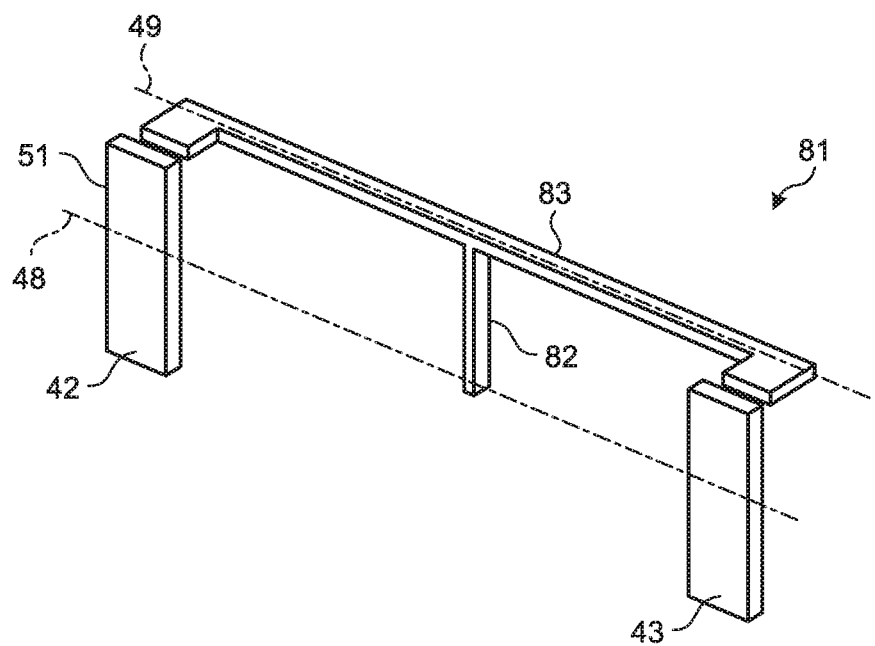
FIG. 22 is a perspective view of an inclination correction mechanism of a medium carrying device according to a third embodiment.
Figure 23:
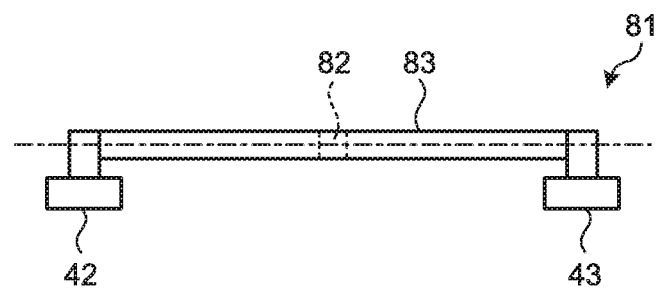
FIG. 23 is a planar view of the inclination correction mechanism of the medium carrying device according to the third embodiment.

In the medium carrying devices according to the embodiments described above, two levers are disposed corresponding to the left-side stopper 42 and the right-side stopper 43. However, alternatively, it is possible to have only a single lever. FIG. 22 is a perspective view of an inclination correction mechanism 81 of a medium carrying device according to a third embodiment. FIG. 23 is a planar view of the inclination correction mechanism 81 of the medium carrying device according to the third embodiment. In the inclination correction mechanism 81, a single lever 82 is substituted for the left-side lever 44 and the right-side lever 45 of the inclination correction mechanism 41 in the medium carrying device 10 according to the first embodiment; a single mechanism 83 is substituted for the left-side interlocking mechanism 46 and the right-side interlocking mechanism 47 of the inclination correction mechanism 41; and the remaining portion is identical to the inclination correction mechanism 41. The lever 82 is disposed in the center position of the medium reading path 17 and is disposed roughly in between the left-side stopper 42 and the right-side stopper 43. Moreover, the lever 82 is supported by the upper carrying guide 55 in a rotatable manner around the lever rotation axis 49, so that the lever 82 is positioned either in a lever path blocking area or in a lever path opening area.

When the lever 82 is positioned in the lever path blocking area, the mechanism 83 fixes the left-side stopper 42 at the left-side stopper path blocking position and fixes the right-side stopper 43 at the right-side stopper path blocking position. On the other hand, when the lever 82 is positioned in the lever path opening area, the mechanism 83 releases the left-side stopper 42 to be able to be positioned at the left-side stopper path opening position, and releases the right-side stopper 43 to be able to be positioned at the right-side stopper path opening position.

In an identical manner to the inclination correction mechanism 41 of the medium carrying device 10 according to the first embodiment, since the medium being carried in the medium reading path abuts against the lever 82, the inclination correction mechanism 81 releases the left-side stopper 42 and the right-side stopper 43. As result of properly fixing and releasing the left-side stopper 42 and the right-side stopper 43, the inclination correction mechanism 81 can correct the medium that is passing obliquely in the medium reading path 17.

Fourth Embodiment

Figure 24:
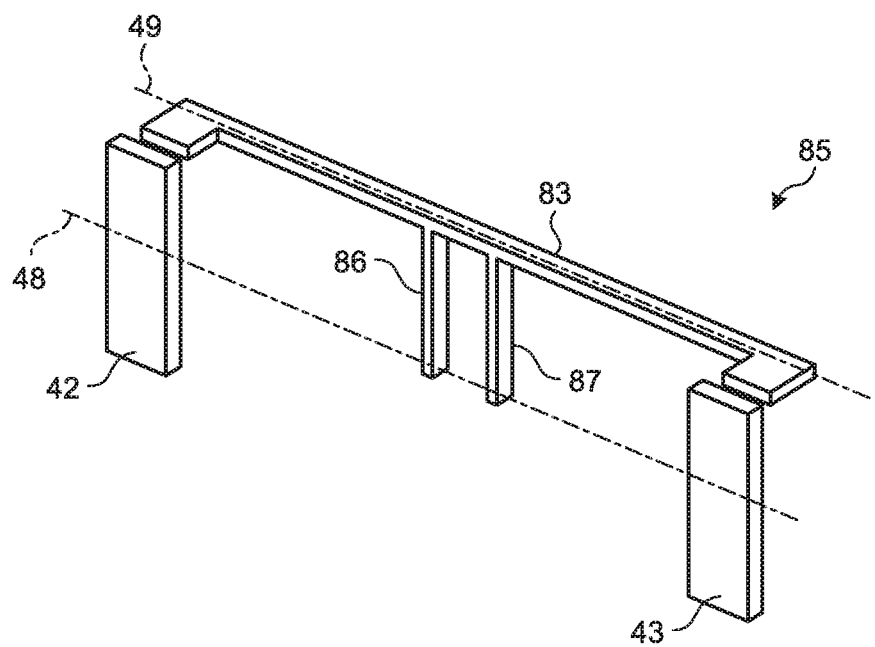
FIG. 24 is a perspective view of an inclination correction mechanism of a medium carrying device according to a fourth embodiment.

In the inclination correction mechanism 81 of the medium carrying device according to the third embodiment, only a single lever 82 is disposed. However, alternatively, it is possible to have a plurality of levers. FIG. 24 is a perspective view of an inclination correction mechanism 85 of a medium carrying device according to a fourth embodiment. In the inclination correction mechanism 85, a left-side lever 86 and a right-side lever 87 are substituted for the lever 82 in the inclination correction mechanism 81 according to the third embodiment; and the remaining portion is identical to the inclination correction mechanism 81.

The left-side lever 86 and the right-side lever 87 are formed in a rod-like shape; are disposed in the center portion of the medium reading path 17; and are roughly disposed in between the left-side stopper 42 and the right-side stopper 43. Moreover, the left-side lever 86 and the right-side lever 87 are fixed to each other via the mechanism 83 and are supported by the upper carrying guide 55 in a rotatable manner around the lever rotation axis 49, so that the left-side lever 86 and the right-side lever 87 are positioned either in the lever path blocking area or in the lever path opening area.

When the left-side lever 86 and the right-side lever 87 are positioned in the lever path blocking area, the mechanism 83 fixes the left-side stopper 42 at the left-side stopper path blocking position and fixes the right-side stopper 43 at the right-side stopper path blocking position. On the other hand, when the left-side lever 86 and the right-side lever 87 are positioned in the lever path opening area, the mechanism 83 releases the left-side stopper 42 to be able to be positioned at the left-side stopper path opening position. Moreover, when the left-side lever 86 and the right-side lever 87 are positioned in the lever path opening area, the mechanism 83 also releases the right-side stopper 43 to be able to be positioned at the right-side stopper path opening position.

In an identical manner to the inclination correction mechanism 81 of the medium carrying device according to the third embodiment, since the medium that is carried in the medium reading path 17 abuts against the left-side lever 86 or the right-side lever 87, the inclination correction mechanism 85 releases the left-side stopper 42 and the right-side stopper 43. As a result of properly fixing and releasing the left-side stopper 42 and the right-side stopper 43, the inclination correction mechanism 85 can correct the medium that is passing obliquely in the medium reading path 17.

Fifth Embodiment

Figure 25:
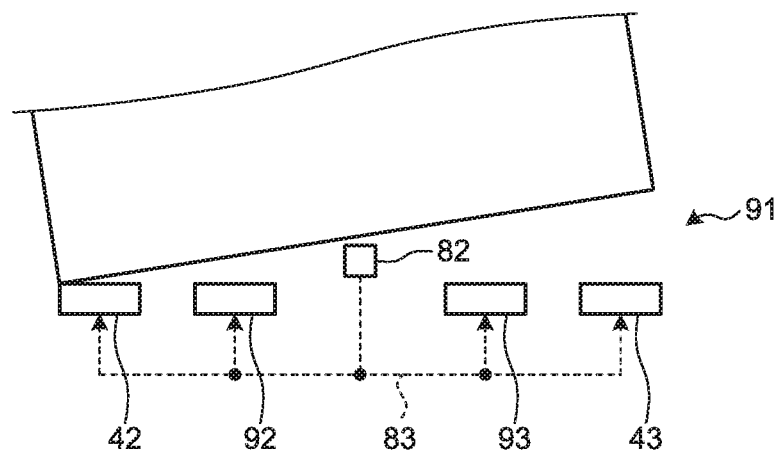
FIG. 25 is a planar view of an inclination correction mechanism of a medium carrying device according to a fifth embodiment.

In the medium carrying device according to the embodiments described above, the left-side stopper 42 and the right-side stopper 43 are disposed. However, alternatively, three or more stoppers can also be disposed. FIG. 25 is a planar view of an inclination correction mechanism 91 of a medium carrying device according to a fifth embodiment. The inclination correction mechanism 91 is configured by adding a left-side stopper 92 and a right-side stopper 93 to the inclination correction mechanism 81 of the medium carrying device according to the third embodiment.

In an identical manner to the left-side stopper 42 or the right-side stopper 43, the left-side stopper 92 is formed in a belt-like shape. Moreover, the left-side stopper 92 is supported by the movable-side frame 3 in a rotatable manner around the stopper rotation axis 48, so that the left-side stopper 92 is positioned either at the left-side stopper path blocking position or at the left-side stopper path opening position. Furthermore, when positioned at the left-side stopper path blocking position, the left-side stopper 92 is positioned at the same position as the position of the left-side stopper 42 in the carrying direction, in an identical manner to the left-side stopper 42 positioned at the left-side stopper path blocking position. Thus, the left-side stopper 92 blocks the medium reading path 17. On the other hand, when positioned at the left-side stopper path opening position, the left-side stopper 92 opens the medium reading path 17, in an identical manner to the left-side stopper 42 positioned at the left-side stopper path opening position.

In an identical manner to the left-side stopper 92, the right-side stopper 93 is formed in a belt-like shape. Moreover, the right-side stopper 93 is supported by the movable-side frame 3 in a rotatable manner around the stopper rotation axis 48, so that the right-side stopper 93 is positioned either at the right-side stopper path blocking position or at the right-side stopper path opening position. Furthermore, when positioned at the right-side stopper path blocking position, the right-side stopper 93 is positioned at the same position as the position of the left-side stopper 42 in the carrying direction, in an identical manner to the right-side stopper 43 positioned at the right-side stopper path blocking position. Thus, the right-side stopper 93 blocks the medium reading path 17. On the other hand, when positioned at the right-side stopper path opening position, the right-side stopper 93 opens the medium reading path 17, in an identical manner to the right-side stopper 43 positioned at the right-side stopper path opening position.

Moreover, when the lever 82 is positioned in the lever path blocking area, the mechanism 83 fixes the left-side stopper 92 at the left-side stopper path blocking position, and fixes the right-side stopper 93 at the right-side stopper path blocking position. On the other hand, when the lever 82 is positioned in the lever path opening area, the mechanism 83 releases the left-side stopper 92 to be able to be positioned at the left-side stopper path opening position, and releases the right-side stopper 93 to be able to be positioned at the right-side stopper path opening position.

In the inclination correction mechanism 91, when the medium that is being carried in the medium reading path 17 abuts against the lever 82, it results in the release of the left-side stopper 42, the right-side stopper 43, the left-side stopper 92, and the right-side stopper 93. In an identical manner to the inclination correction mechanisms described earlier, as a result of properly fixing and releasing the left-side stopper 42, the right-side stopper 43, the left-side stopper 92, and the right-side stopper 93; the inclination correction mechanism 91 can correct the medium that is passing obliquely in the medium reading path 17. In an identical manner to the medium carrying device according to the embodiments described above, in the medium carrying device according to the fifth embodiment, even when a narrow medium is carried, paper jam can be prevented from occurring and the medium can be properly carried.

Sixth Embodiment

Figure 26:
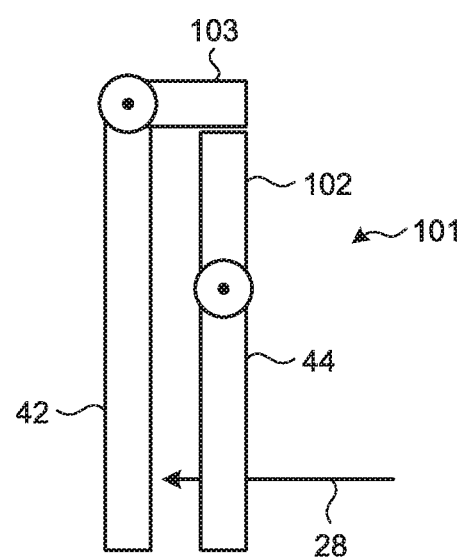
FIG. 26 is a lateral view of a left-side interlocking mechanism of a medium carrying device according to a sixth embodiment.

In the left-side interlocking mechanism 46 according to the first embodiment, the stopper-side abutting portion 51 and the lever-side abutting portion 52 are disposed. However, other abutting portions other than the stopper-side abutting portion 51 and the lever-side abutting portion 52 can also be disposed. In a medium carrying device according to a sixth embodiment, as illustrated in FIG. 26, a different left-side interlocking mechanism 101 is substituted for the left-side interlocking mechanism 46 of the medium carrying device 10 according to the first embodiment, and the remaining portion is identical to the medium carrying device 10. FIG. 26 is a lateral view of the left-side interlocking mechanism 101 of the medium carrying device according to the sixth embodiment. The left-side interlocking mechanism 101 includes a lever-side abutting portion 102 and a stopper-side abutting portion 103. The lever-side abutting portion 102 is disposed on the upper side of the left-side lever 44, and is fixed to the left-side lever 44. The stopper-side abutting portion 103 is disposed on the upper side of the lever-side abutting portion 102, and is fixed to the left-side stopper 42 via a fixing member (not illustrated).

When the left-side lever 44 is positioned in the left-side lever path blocking area and when the left-side stopper 42 is positioned at the left-side stopper path blocking position, the lever-side abutting portion 102 abuts against the stopper-side abutting portion 103. When the lever-side abutting portion 102 abuts against the stopper-side abutting portion 103, the left-side stopper 42 gets fixed to the movable-side frame 3 while being positioned at the left-side stopper path blocking position.

When the left-side lever 44 is positioned either in the left-side lever path opening area or at the left-side boundary position, the lever-side abutting portion 102 is disposed to not abut against the stopper-side abutting portion 103. When the left-side lever 44 is positioned either in the left-side lever path opening area or at the left-side boundary position, the left-side stopper 42 is released to perform positive rotation to the left-side stopper path opening position, so that the lever-side abutting portion 102 does not abut against the stopper-side abutting portion 103.

In the medium carrying device according to the sixth embodiment, the right-side interlocking mechanism can be configured in an identical manner to the left-side interlocking mechanism 101. Moreover, in an identical manner to the medium carrying device 10 according to the first embodiment, in the medium carrying device according to the sixth embodiment too, the medium that is passing obliquely in the medium reading path 17 can be corrected; and, even when a narrow medium is carried, paper jam can be prevented from occurring and the medium can be properly carried.

Seventh Embodiment

Figure 27:
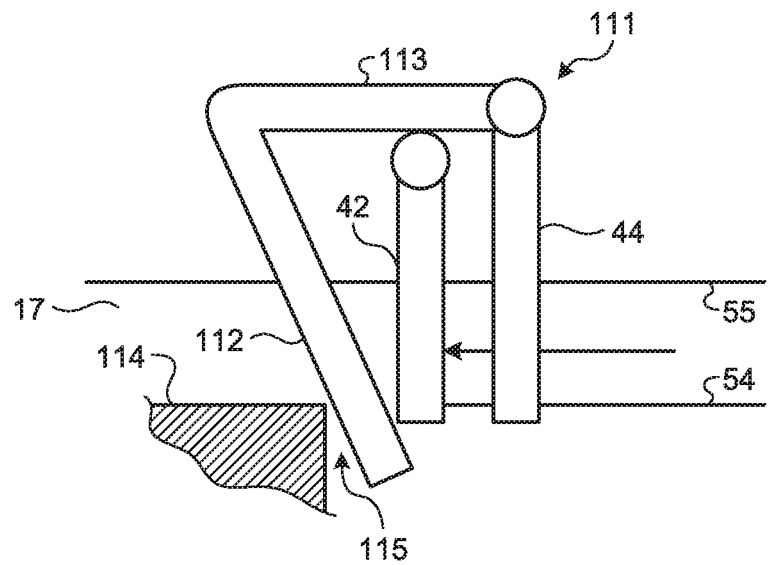
FIG. 27 is a lateral view of a left-side interlocking mechanism of a medium carrying device according to a seventh embodiment.

In a medium carrying device according to a seventh embodiment, as illustrated in FIG. 27, a different left-side interlocking mechanism 111 is substituted for the left-side interlocking mechanism 46 of the medium carrying device 10 according to the first embodiment, and the remaining portion is identical to the medium carrying device 10. FIG. 27 is a lateral view of the left-side interlocking mechanism 111 of the medium carrying device according to the seventh embodiment. The left-side interlocking mechanism 111 includes a rotation stopping member 112 and a fixing member 113. The rotation stopping member 112 is fixed to the left-side lever 44 via the fixing member 113. When the left-side lever 44 is positioned in the left-side lever path blocking area, the rotation stopping member 112 gets inserted in a gap 115 formed between a portion 114 of the lower carrying guide 54 and the left-side stopper 42. When the rotation stopping member 112 is positioned in the gap 115, the left-side stopper 42 gets fixed to the upper carrying guide 55 while being positioned at the left-side stopper path blocking position.

When the left-side lever 44 is positioned either in the left-side lever path opening area or in the left-side boundary position, the rotation stopping member 112 comes out from the gap 115 and is positioned on the outside of the medium reading path 17. When the rotation stopping member 112 is removed from the gap 115, the left-side stopper 42 is released to be positioned at the left-side stopper path opening position.

In the medium carrying device according to the seventh embodiment, the right-side interlocking mechanism can be configured in an identical manner to the left-side interlocking mechanism 111. In the medium carrying device according to the seventh embodiment, in an identical manner to the medium carrying device 10 according to the first embodiment, the medium that is passing obliquely in the medium reading path 17 can be corrected; and, even when a narrow medium is carried, paper jam can be prevented from occurring and the medium can be correctly carried. In the medium carrying device according to the seventh embodiment, as a result of insertion of the rotation stopping member 112 in the gap 115, the left-side stopper 42 can be positioned at the left-side stopper path blocking position in a more reliable and tight manner as compared to the medium carrying device 10 according to the first embodiment.

Eighth Embodiment

Figure 28:
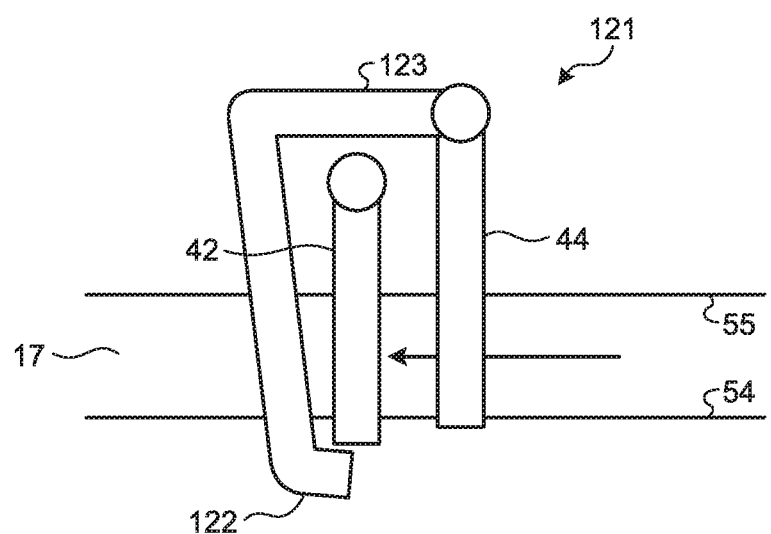
FIG. 28 is a lateral view of a left-side interlocking mechanism of a medium carrying device according to an eighth embodiment.
Figure 29:
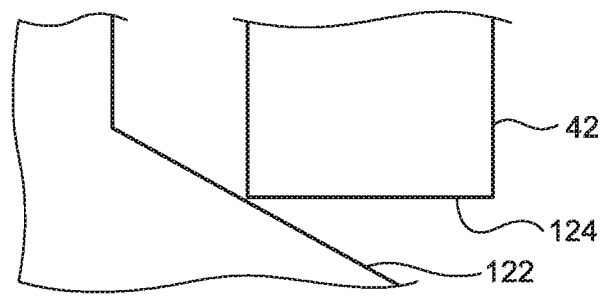
FIG. 29 is an enlarged view of the portion of contact of a sphenoid member with the left-side stopper of the medium carrying device according to the eighth embodiment.

In a medium carrying device according to an eighth embodiment, as illustrated in FIG. 28, a different left-side interlocking mechanism 121 is substituted for the left-side interlocking mechanism 46 of the medium carrying device 10 according to the first embodiment, and the remaining portion is identical to the medium carrying device 10. FIG. 28 is a lateral view of the left-side interlocking mechanism 121 of the medium carrying device according to the eighth embodiment. The left-side interlocking mechanism 121 includes a sphenoid member 122 and a fixing member 123. The sphenoid member 122 is fixed to the left-side lever 44 via the fixing member 123. When the left-side lever 44 is positioned in the left-side lever path blocking area, the sphenoid member 122 is disposed on the lower side of the left-side stopper 42 and abuts against a lower end 124 of the left-side stopper 42 as illustrated in FIG. 29. FIG. 29 is an enlarged view of the portion of contact between the sphenoid member 122 and the left-side stopper 42 of the medium carrying device according to the eighth embodiment. When the sphenoid member 122 abuts against the lower end 124, the left-side stopper 42 gets fixed to the upper carrying guide 55 while being positioned at the left-side stopper path blocking position.

When the left-side lever 44 is positioned either in the left-side lever path opening area or at the left-side boundary position, the sphenoid member 122 moves away from the lower end 124 and gets positioned on the outside of the medium reading path 17. When the sphenoid member 122 moves away from the lower end 124, the left-side stopper 42 is released to be positioned at the left-side stopper path opening position.

In the medium carrying device according to the eighth embodiment, the right-side interlocking mechanism can be configured in an identical manner to the left-side interlocking mechanism 111. In an identical manner to the medium carrying device 10 according to the first embodiment, in the medium carrying device according to the eighth embodiment too, the medium that is passing obliquely in the medium reading path 17 can be corrected; and, even when a narrow medium is carried, paper jam can be prevented from occurring and the medium can be properly carried. Moreover, in the medium carrying device according to the eighth embodiment, since the sphenoid member 122 abuts against the lower end 124, the left-side stopper 42 can be positioned at the left-side stopper path blocking position in a more reliable and tight manner as compared to the medium carrying device 10 according to the first embodiment.

Ninth Embodiment

Figure 30:
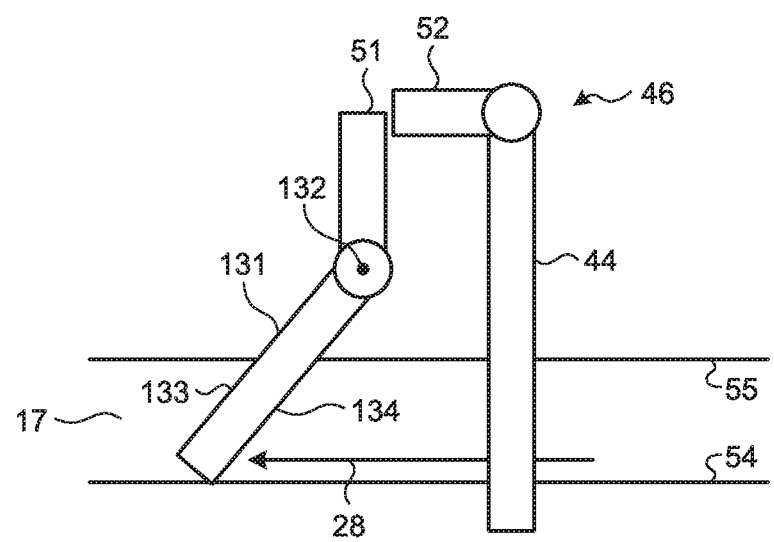
FIG. 30 is a lateral view of a left-side stopper of a medium carrying device according to a ninth embodiment.

In a medium carrying device according to a ninth embodiment, as illustrated in FIG. 30, a different left-side stopper 131 is substituted for the left-side stopper 42 of the medium carrying device 10 according to the first embodiment, and the other portion is identical to the medium carrying device 10. FIG. 30 is a lateral view of the left-side stopper 131 of the medium carrying device according to the ninth embodiment. The left-side stopper 131 is formed in a belt-like shape and is supported by the movable-side frame 3 in a rotatable manner around a stopper rotation axis 132, so that the left-side stopper 131 is positioned either at the left-side stopper path blocking position or at the left-side stopper path opening position. When positioned at the left-side stopper path blocking position, the left-side stopper 131 intersects with the plane along the lower carrying guide 54 and with the plane along with the upper carrying guide 55. That is, the left-side stopper 131 includes a left-side stopper portion 133 that, when the left-side stopper 131 is positioned at the left-side stopper path blocking position, overlaps with the medium reading path 17. When the left-side stopper 131 is positioned at the left-side stopper path blocking position, the left-side stopper portion 133 blocks the medium reading path 17. When the left-side stopper 131 is positioned at the left-side stopper path blocking position, the left-side stopper portion 133 is positioned in such a way that an end 134 thereof on the side in the opposite direction to the carrying direction 28 faces obliquely downward. Herein, it is illustrated that a straight line running along the end 134 and the carrying direction form an angle of 45°.

Figure 31:
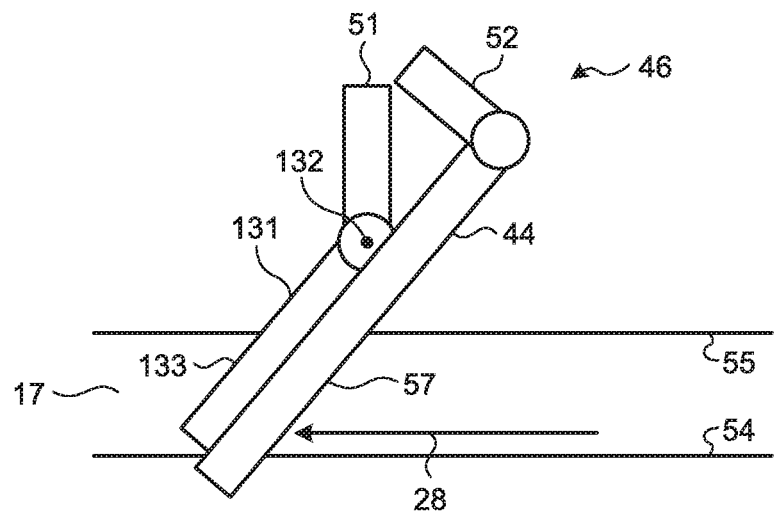
FIG. 31 is a lateral view of the left-side stopper at the time when the left-side lever is positioned at the left-side boundary position.

FIG. 31 is a lateral view of the left-side stopper 131 at the time when the left-side lever 44 is positioned at the left-side boundary position. When the left-side stopper 131 is positioned at the left-side stopper path blocking position, the position of the left-side stopper portion 133 along the carrying direction 28 is roughly identical to the position of the left-side lever portion 57 along the carrying direction 28 at the time when the left-side lever 44 is positioned at the left-side boundary position.

Figure 32:
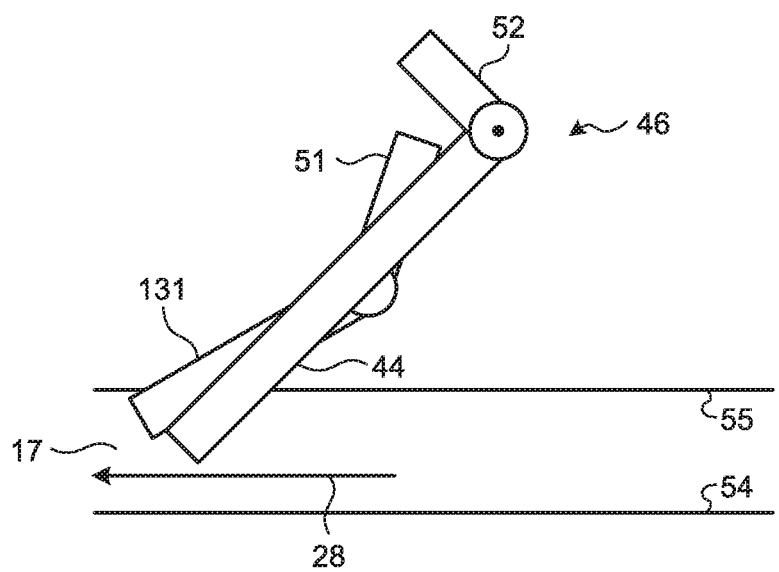
FIG. 32 is a lateral view of the left-side stopper positioned at the left-side stopper path opening position.

FIG. 32 is a lateral view of the left-side stopper 131 positioned at the left-side stopper path opening position. When the left-side lever 44 is positioned in the left-side lever path opening area, the left-side stopper 131 is released so as to be able to be positioned at the left-side stopper path opening position. When positioned at the left-side stopper path opening position, the left-side stopper 131 releases the medium reading path 17 so that the medium is carried in the medium reading path 17.

In the medium carrying device according to the ninth embodiment, the right-side stopper can be configured in an identical manner to the left-side stopper 131. In the medium carrying device according to the ninth embodiment, in an identical manner to the medium carrying device 10 according to the first embodiment, the medium that is passing obliquely in the medium reading path can be corrected; and, even when a narrow medium is carried, paper jam can be prevented from occurring and the medium can be properly carried. Moreover, in the medium carrying device according to the ninth embodiment, when the left-side stopper 131 is positioned at the left-side stopper path blocking position, since the end 134 is facing obliquely downward, the medium that is carried in the medium reading path 17 can be further made to move along the lower carrying guide 54.

10-Th Embodiment

Figure 33:
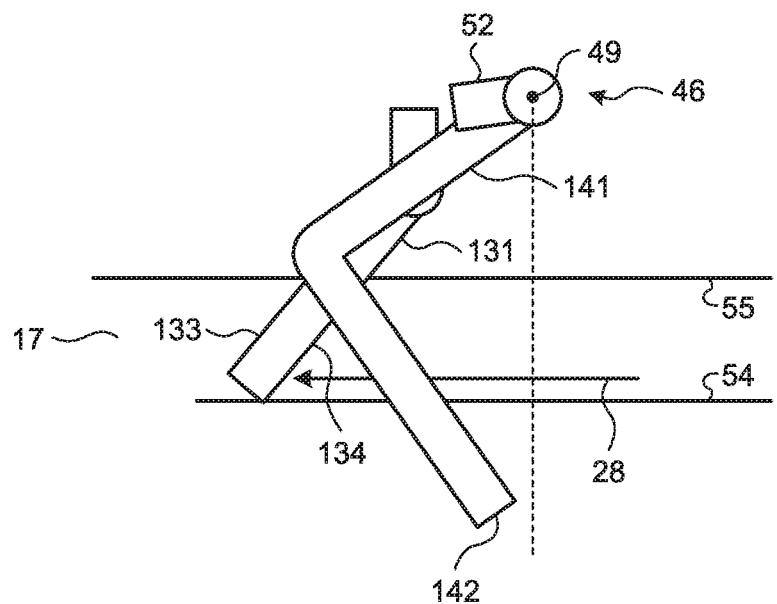
FIG. 33 is a lateral view of a left-side lever of a medium carrying device according to a 10-th embodiment.

In a medium carrying device according to a 10-th embodiment, as illustrated in FIG. 33, a different left-side lever 141 is substituted for the left-side lever 44 of the medium carrying device according to the ninth embodiment, and the remaining portion is identical to the medium carrying device according to the ninth embodiment. FIG. 33 is a lateral view of the left-side lever 141 of the medium carrying device according to the 10-th embodiment. The left-side lever 141 is formed in a curved belt-like shape and is movably supported by the upper carrying guide 55, so that the left-side lever 141 is positioned either in the left-side lever path blocking area or in the left-side lever path opening area. When positioned in the left-side lever path blocking area, the left-side lever 141 blocks the medium reading path 17. Moreover, the left-side lever 141 is formed in such a way that, when positioned in the left-side lever path blocking area, a lower leading end 142 thereof is positioned on the side of the carrying direction 28 more than the lever rotation axis 49.

Figure 34:
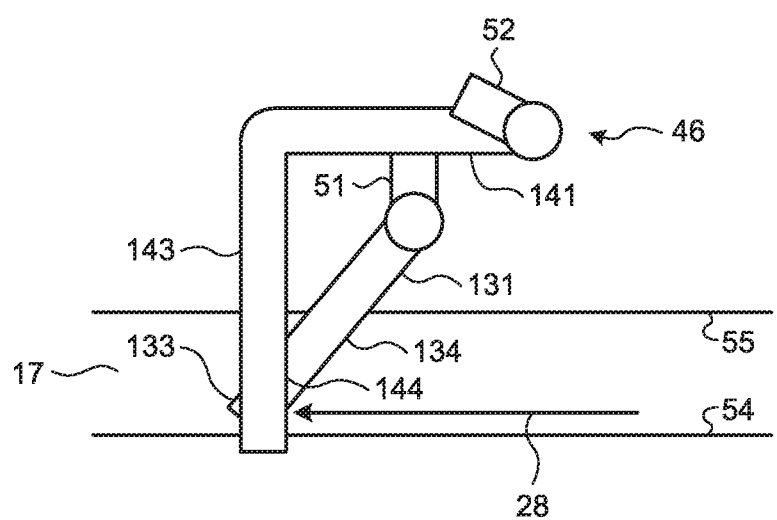
FIG. 34 is a lateral view of the left-side lever positioned at the left-side boundary position.

As illustrated in FIG. 34, the left-side lever 141 passes through the left-side boundary position at the time of moving from the left-side lever path blocking area into the left-side lever path opening area. FIG. 34 is a lateral view of the left-side lever 141 positioned at the left-side boundary position. The left-side lever 141 includes a left-side lever portion 143 that, when the left-side lever 141 is positioned at the left-side boundary position, overlaps with the medium reading path 17. When the left-side lever 141 is positioned at the left-side boundary position, the position of the left-side lever portion 143 along the carrying direction 28 is roughly identical to the position of the left-side stopper portion 56 along the carrying direction 28 at the time when the left-side stopper 42 is positioned at the left-side stopper path blocking position. Moreover, when the left-side lever 141 is positioned at the left-side stopper path blocking position, an end 144 of the left-side lever portion 143 on the side in the opposite direction to the carrying direction 28 is formed to be along a straight line perpendicular to the plane along the medium reading path 17.

Figure 35:
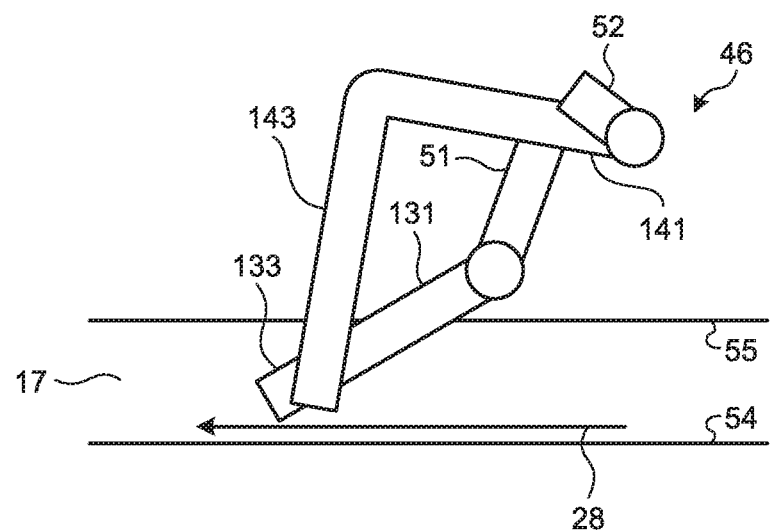
FIG. 35 is a lateral view of the left-side lever positioned in the left-side lever path opening area.

FIG. 35 is a lateral view of the left-side lever 141 positioned in the left-side lever path opening area. When positioned in the left-side lever path opening area, the left-side lever 141 opens the medium reading path 17.

In the medium carrying device according to the 10-th embodiment, the right-side lever can be configured in an identical manner to the left-side lever 141. In an identical manner to the medium carrying device according to the ninth embodiment, in the medium carrying device according to the 10-th embodiment too, the medium that is passing obliquely in the medium reading path 17 can be corrected; and, even when a narrow medium is carried, paper jam can be prevented from occurring and the medium can be properly carried. In the medium carrying device according to the 10-th embodiment, since the left-side lever 141 that is positioned at the left-side boundary position has the end 144 along a straight line perpendicular to the plane along the medium reading path 17, the left-side stopper 131 can be released at a predetermined timing. The predetermined timing is roughly identical to the timing at which the leading end of the medium being carried in the medium reading path 17 is adjusted along the plane perpendicular to the carrying direction. In the medium carrying device according to the 10-th embodiment, as a result of releasing the left-side stopper 131 at a predetermined timing, the obliquely-passing medium can be corrected with a higher degree of accuracy.

In the medium carrying device, after the maintenance is carried out, there are times when the movable-side frame 3 moves from the open position to the closed position while the medium is still placed in the lower carrying guide 54. When the position of the leading end of the left-side lever along the carrying direction 28 is same as the position of the lever rotation axis 49, there are times when the leading end of the left-side lever abuts against the medium, thereby damaging the medium. When the leading end 142 of the left-side lever 141, which is positioned in the left-side lever path blocking area, is positioned on the side of the carrying direction 28 due to the lever rotation axis 49; at the time of the movement of the movable-side frame 3 to the closed position, the leading end 142 performs positive rotation along the medium. When the movable-side frame 3 moves from the open position to the closed position, as a result of the positive rotation of the left-side lever 141 along the medium, it becomes possible to prevent the medium from getting damaged.

11-Th Embodiment

Figure 36:
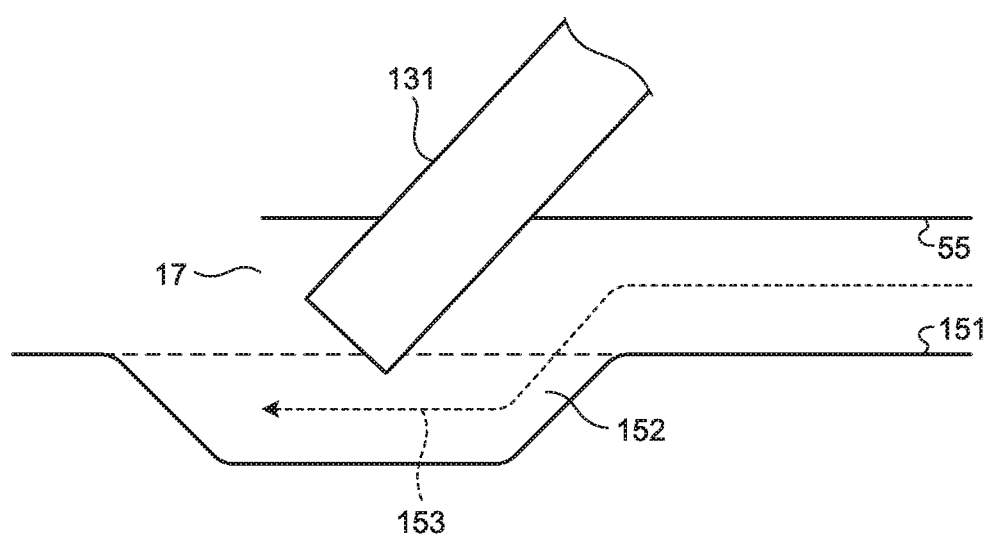
FIG. 36 is a lateral cross-sectional view of a lower carrying guide of a medium carrying device according to an 11-th embodiment.

In a medium carrying device according to an 11-th embodiment, as illustrated in FIG. 36, a different lower carrying guide 151 is substituted for the lower carrying guide 54 of the medium carrying device according to the 10-th embodiment, and the remaining portion is identical to the medium carrying device according to the 10-th embodiment. FIG. 36 is a lateral cross-sectional view of the lower carrying guide 151 of the medium carrying device according to the 11-th embodiment. The lower carrying guide 151 has a depression 152 formed therein. The depression 152 constitutes a diversionary path 153 that is formed on the lower side of the left-side stopper 131 and that connects the portion on the rear side of the left-side stopper 131 and the portion on the front side of the left-side stopper 131 in the medium reading path 17.

Figure 37:
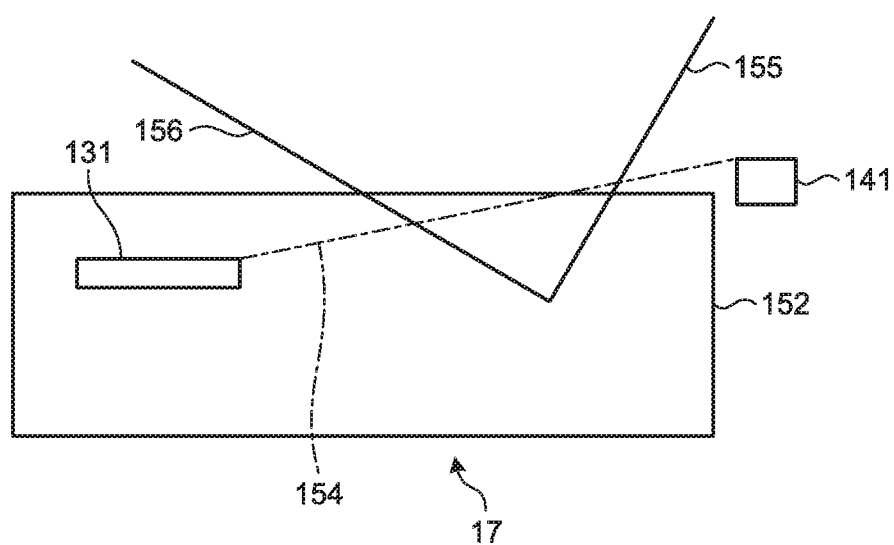
FIG. 37 is a planar view of the lower carrying guide of the medium carrying device according to the 11-th embodiment.

FIG. 37 is a planar view of the lower carrying guide 151 of the medium carrying device according to the 11-th embodiment. The depression 152 is formed in such a way that the lower portion of the left-side stopper 131 is connected to the area in between the left-side stopper 131 and the left-side lever 141, and in such a way that the distance between the left end of the depression 152 and the left-side stopper 131 is shorter than a predetermined length.

In an identical manner to the medium carrying device according to the 10-th embodiment, in the medium carrying device according to the 11-th embodiment too, the medium that is passing obliquely in the medium reading path 17 can be corrected; and, even when a narrow medium is carried, paper jam can be prevented from occurring and the medium can be properly carried.

In the medium carrying device according to the 11-th embodiment, there are times when a narrow medium 155 is carried. The medium 155 is formed in such a way that, while being carried in the medium reading path 17, it abuts against the left-side stopper 131 but does not abut against the left-side lever 141. As a result of abutting against the left-side stopper 131 while being carried in the medium reading path 17, the medium 155 is carried along the lower carrying guide 151. When the straight line along a leading end 156 of the medium 155 is not intersecting with a line segment 154, as a result of abutting against the left-side stopper 131, the portion of the leading end 156 on the right-hand side of the left-side stopper 131 rotates to move along the carrying direction 28 (clockwise rotation with reference to FIG. 37). When the straight line along the leading end 156 intersects with the line segment 154 that joins the left-side stopper 131 and the left-side lever 141, the medium 155 is guided to the diversionary path 153 due to the left-side stopper 131. As a result of being guided to the diversionary path 153, the medium 155 bypasses the left-side stopper 131 and is carried to the portion on the anterior side of the left-side stopper 131 in the medium reading path 17. For that reason, in the medium carrying device according to the 11-th embodiment, even when the medium 155 is carried, paper jam can be prevented from occurring and the medium 155 can be properly carried.

Meanwhile, the depression 152 can be formed in a different shape. Examples of the shape of the depression 152 include a linear groove in which the lower end of the left-side stopper 131 enters. Of that groove, the rear edge on the side in the opposite direction to the carrying direction 28 is inclined with respect to the plane perpendicular to the carrying direction 28, so that the rear edge intersects with the line segment 154 and the right-hand side moves closer to the side in the carrying direction 28. Moreover, of that groove, the front edge on the side in the carrying direction 28 is formed to run along another the straight line parallel to the straight line along the rear edge. In that case too, in the medium carrying device according to the 11-th embodiment, paper jam can be prevented from occurring and the medium 155 can be properly carried.

In the medium carrying device according to the 11-th embodiment, in an identical manner to the depression 152, a depression in which the lower end of the right-side stopper enters can be formed in the lower carrying guide 151. In the medium carrying device according to the 11-th embodiment, as a result of forming such a depression, a medium that abuts against the right-side stopper but does not abut against the left-side lever can be properly carried without causing paper jam.

12-Th Embodiment

Figure 38:
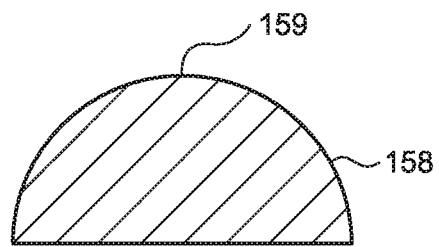
FIG. 38 is a cross-sectional view of a left-side stopper of a medium carrying device according to a 12-th embodiment.

In a medium carrying device according to a 12-th embodiment, as illustrated in FIG. 38, a different left-side stopper 158 is substituted for the left-side stopper 42 of the medium carrying device 10 according to the first embodiment. FIG. 38 is a cross-sectional view of the left-side stopper 158 of the medium carrying device according to the 12-th embodiment. In the left-side stopper 158, the face on the side in the carrying direction 28 is formed to be along the planar surface, and a face 159 on the side in the opposite direction to the carrying direction 28 is formed to be along the cylindrical surface.

In an identical manner to the medium carrying device 10 according to the first embodiment, in the medium carrying device according to the 12-th embodiment too, the medium that is passing obliquely in the medium reading path 17 can be corrected; and, even when a narrow medium is carried, paper jam can be prevented from occurring and the medium can be properly carried. Moreover, in the medium carrying device according to the 12-th embodiment, since the face 159 is formed to be along the cylindrical surface, the medium that abuts against the left-side stopper 158 can be prevented from getting damaged. Meanwhile, the face 159 can be formed to be smooth without any angularness. In that case too, in the medium carrying device according to the 12-th embodiment, the medium that abuts against the left-side stopper 158 can be prevented from getting damaged.

13-Th Embodiment

Figure 39:
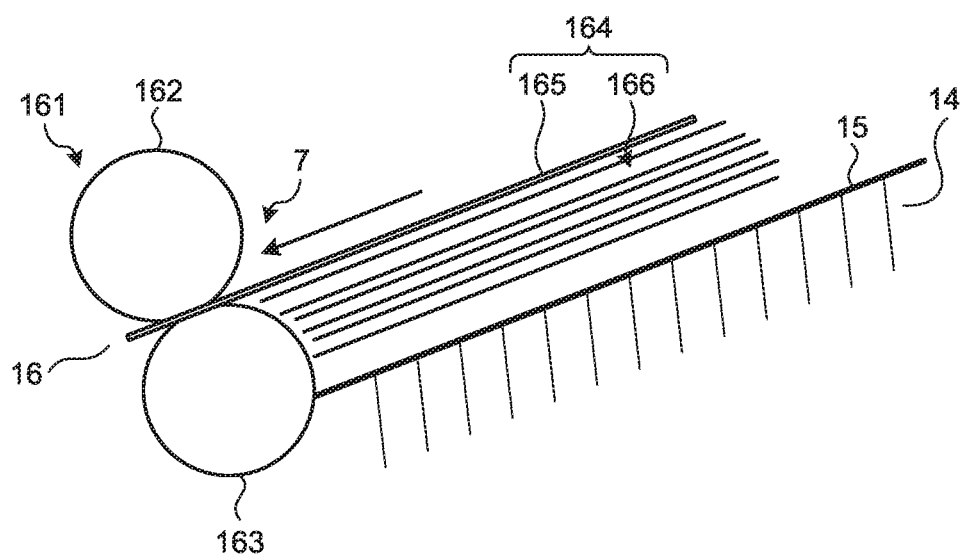
FIG. 39 is a lateral view of a separating unit of a medium carrying device according to a 13-th embodiment.

In a medium carrying device according to a 13-th embodiment, as illustrated in FIG. 39, a different separating unit 161 is substituted for the separating unit 21 of the medium carrying device 10 according to the first embodiment, and the remaining portion is identical to the medium carrying device 10. FIG. 39 is a lateral view of the separating unit 161 of the medium carrying device according to the 13-th embodiment. The separating unit 161 includes a pick roller 162 and a brake roller 163. The pick roller 162 is disposed on the upper side of the medium separation path 16 and is rotatably supported by the movable-side frame 3. The pick roller 162 performs positive rotation (clockwise rotation with reference to FIG. 39) so that, from among a plurality of mediums 164 inserted in the medium separation path 16 from the separation port 7, a medium 165 that is placed on the top is carried toward the junction 12.

The brake roller 163 is disposed on the lower side of the medium separation path 16; is disposed on the lower side of the pick roller 162 in an abutting manner to the pick roller 162; and is rotatably supported by the fixed-side frame 2. When the pick roller 162 is performing positive rotation, while no medium is sandwiched between the pick roller and the brake roller 163; the brake roller 163 follows the pick roller 162 and performs positive rotation (counterclockwise rotation with reference to FIG. 39). When the mediums 164 are sandwiched between the pick roller 162 and the brake roller 163, the brake roller 163 performs reverse rotation (counterclockwise rotation with reference to FIG. 36) so that, from among the mediums 164, other mediums 166 other than the medium 165 are carried toward the pedestal 14. When the brake roller 163 is in contact with the medium 165 that is carried by pick roller 162, it follows the medium 165 and performs positive rotation.

In an identical manner to the medium carrying device 10 according to the first embodiment, in the medium carrying device according to the 13-th embodiment too, the medium that is passing obliquely in the medium reading path 17 can be corrected; and, even when a narrow medium is carried, paper jam can be prevented from occurring and the medium can be properly carried.

Figure 40:
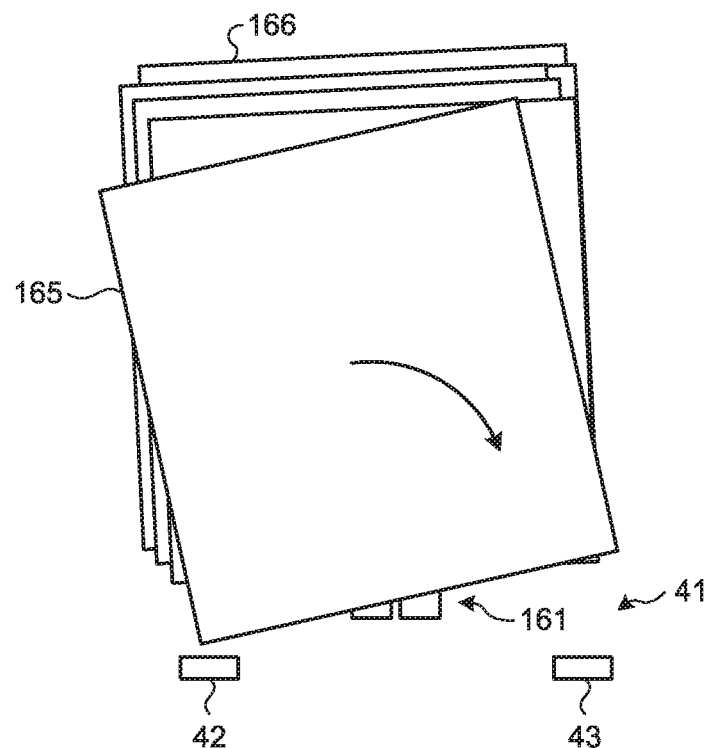
FIG. 40 is a planar view of a medium that is carried to the inclination correction mechanism by the separating unit of the medium carrying device according to the 13-th embodiment.

FIG. 40 is a planar view of the medium 165 that is carried to the inclination correction mechanism 41 by the separating unit 161 of the medium carrying device according to the 13-th embodiment. When the medium 165 is corrected by the inclination correction mechanism 41 on the way while being carried by the separating unit 161, there are times when there is rotation of the portion of the medium 165 on the farther side from the inclination correction mechanism 41 more than the separating unit 161. Since the medium 165 is placed on the top of the mediums 164, the portion of the medium 165 on the farther side from the inclination correction mechanism 41 more than the separating unit 161 is easily rotatable and can be properly corrected.

Figure 41:
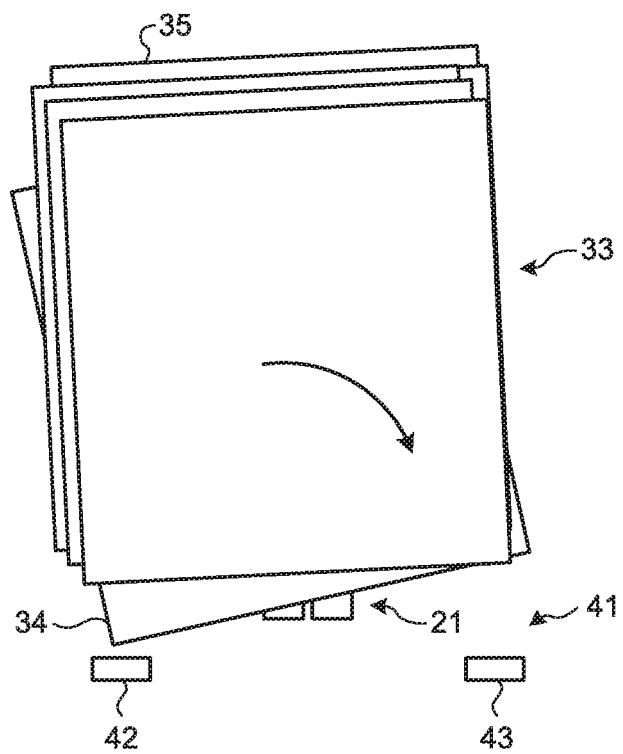
FIG. 41 is a planar view of the medium that is carried to the inclination correction mechanism by the separating unit of the medium carrying device according to the first embodiment.

FIG. 41 is a planar view of the medium 34 that is carried to the inclination correction mechanism 41 by the separating unit 21 of the medium carrying device 10 according to the first embodiment. Of the medium 34, the portion on the farther side from the inclination correction mechanism 41 more than the separating unit 21 gets sandwiched between the mediums 35 and the pedestal 14, and finds it difficult to rotate as compared to the medium 165. Hence, in the medium carrying device according to the 13-th embodiment, the medium 165 can be corrected more properly as compared to the medium carrying device 10 according to the first embodiment.

Meanwhile, the left-side stopper 42 is configured to move to the left-side stopper path blocking position due to its own weight. Alternatively, the medium carrying device can include a biasing unit for biasing the left-side stopper 42 toward the left-side stopper path blocking position. Examples of the biasing unit include an elastic body that applies elastic force to the left-side stopper 42 so that the left-side stopper 42 moves to the left-side stopper path blocking position. Moreover, the left-side lever 44 is configured to move in the left-side lever path blocking area due to its own weight. Alternatively, the medium carrying device can include a biasing unit for biasing the left-side lever 44 toward the left-side lever path blocking area. Examples of the biasing unit include an elastic body that applies elastic force to the left-side lever 44 so that the left-side lever 44 moves in the left-side lever path blocking area. Even when such biasing units are disposed in the medium carrying device, in an identical manner to the medium carrying devices according to the embodiments described above, the medium that is passing obliquely in the medium reading path 17 can be corrected; paper jam can be prevented from occurring; and the medium can be properly carried.

The image reading device disclosed herein enables proper correction of the obliqueness of a medium.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the disclosure have been described in detail, it should be understood that the various changes, substitutions, and alterations could be made hereto without departing from the spirit and scope of the disclosure.

What is claimed is:

1. A medium carrying device comprising:
a medium transporting path comprising a medium guide surface on which a medium is transported from an upstream end to a downstream end of the medium guide surface, the medium guide surface comprising 1) a first side edge that extends from the upstream end to the downstream and 2) a second side edge opposite the first side edge, the second side edge extending from the upstream end to the downstream end; and
a medium alignment mechanism disposed along the medium transporting path, the medium alignment mechanism comprising a first lever, a first stopper, and a second stopper disposed on the medium transporting path, the medium alignment mechanism configured to correct an alignment of the medium using the first lever, the first stopper, and the second stopper,
wherein the first lever, the first stopper, and the second stopper respectively include a first lever forefront, a first stopper forefront, and a second stopper forefront that contact a leading-edge of the medium when the medium passes through the medium alignment mechanism,
wherein the first lever forefront of the first lever is disposed closer to the upstream end of the medium transporting path than the first stopper forefront of the first stopper and the second stopper forefront of the second stopper,
wherein the first stopper forefront of the first stopper is disposed closer to the first side edge of the medium guide surface than the first lever forefront of the first lever and the second stopper, the second stopper forefront of the second stopper is disposed farther from the first side edge of the medium guide surface than the first stopper forefront of the first stopper and the first lever forefront of the first lever, the first lever forefront of the first lever is disposed farther from the first side edge of the medium guide surface than the first stopper forefront of the first stopper and closer to the first side edge of the medium guide surface than the second stopper forefront of the second stopper,
wherein the first stopper forefront of the first stopper and the second stopper forefront of the second stopper align with one another when viewed from the first stopper toward the second side edge in a first direction that is perpendicular to 1) a transportation direction of the medium along the medium transporting path and 2) a second direction that is perpendicular to the medium guide surface,
wherein when the leading-edge of the medium being transported along the medium transporting path comes in contact with the first stopper forefront of the first stopper and the first lever forefront of the first lever while the leading edge of the medium is not in contact with the second stopper, the first lever rotates about a first lever rotation axis while the first stopper and the second stopper do not move to prevent the medium from traveling past the medium alignment mechanism to the downstream end, and
wherein when 1) the first lever forefront of the first lever, when viewed from the first stopper toward the second side edge in the first direction, aligns with the first stopper forefront of the first stopper and the second stopper forefront of the second stopper and 2) the leading-edge of the medium being transported along the medium transporting path comes in contact with the first lever forefront of the first lever, the first stopper forefront of the first stopper, and the second stopper forefront of the second stopper, A) the first lever further rotates about the first lever rotation axis and B) the first stopper and the second stopper rotate about a first stopper rotation axis and a second stopper rotation axis, respectively, allowing the medium to travel to the downstream end.

2. The medium carrying device according to claim 1, wherein the first lever includes a first lever abutting portion that disposed on a first lever backside opposite the first lever forefront of the first lever,
the first lever abutting portion extends from the first lever backside of the first lever toward the first stopper forefront of the first stopper,
when 1) the leading-edge of the medium being transported along the medium transporting path does not come in contact with the first stopper, the first lever, and the second stopper and 2) the first stopper, the first lever, and the second stopper do not rotate about the first stopper rotation axis, the first lever rotation axis, and the second stopper rotation axis, respectively, the first lever abutting portion of the first lever abuts the first stopper forefront of the first stopper, and
when the leading-edge of the medium being transported along the medium transporting path comes in contact with the first stopper forefront of the first stopper and the first lever forefront of the first lever while the leading edge of the medium is not in contact with the second stopper forefront of the second stopper, 1) the first lever rotates about the first lever rotation axis and 2) the rotation of the first lever about the first lever rotation axis releases the abutting of the first lever abutting portion on the first stopper forefront of the first stopper.

3. The medium carrying device according to claim 1, wherein the medium alignment mechanism comprises a second lever,
wherein the second lever includes a second lever forefront that contacts the leading-edge of the medium when the medium passes through the medium alignment mechanism,
wherein the second lever forefront of the second lever is disposed farther from the first side edge of the medium guide surface than the first stopper forefront of the first stopper and the first lever forefront of the first lever,
wherein the second lever forefront of the second lever aligns with the first lever forefront of the first lever when viewed from the first lever toward the second side edge in the first direction that is perpendicular to 1) the transportation direction of the medium along the medium transporting path and 2) the second direction that is perpendicular to the medium guide surface,
wherein when the leading-edge of the medium being transported along the medium transporting path comes in contact with the first stopper forefront of the first stopper, the first lever forefront of the first lever, and the second lever forefront of the second lever while the leading edge of the medium is not in contact with the second stopper, the first lever rotates about the first lever rotation axis and the second lever rotates about a second lever rotation axis while the first stopper and the second stopper do not move to prevent the medium from traveling past the medium alignment mechanism to the downstream end, and
wherein when 1) the first lever forefront of the first lever and the second lever forefront of the second lever, when viewed from the first stopper toward the second side edge in the first direction, align with the first stopper forefront of the first stopper and the second stopper forefront of the second stopper and 2) the leading-edge of the medium being transported along the medium transporting path comes in contact with the first lever, the second lever, the first stopper, and the second stopper, A) the first lever and the second lever further rotate about the respective first lever rotation axis and second lever rotation axis and B) the first stopper and the second stopper rotate about a first stopper rotation axis and a second stopper rotation axis, respectively, allowing the medium to travel to the downstream end.

4. The medium carrying device according to claim 3, wherein
the first lever includes a first lever abutting portion that disposed on a first lever backside opposite the first lever forefront of the first lever,
the first lever abutting portion extends from the first lever backside of the first lever toward the first stopper forefront of the first stopper,
the second lever includes a second lever abutting portion that disposed on a second lever backside opposite the first lever forefront of the first lever,
the second lever abutting portion extends from the second lever backside of the second lever toward the second stopper forefront of the second stopper,
when the leading-edge of the medium being transported along the medium transporting path does not come in contact with the first lever and the second lever, 1) the first lever does not rotate about the first lever rotation axis and 2) the second lever does not rotate about the second lever rotation axis,
when the first lever does not rotate about the first lever rotation axis, the first lever abutting portion of the first lever abuts the first stopper forefront of the first stopper,
when the second lever does not rotate about the second lever rotation axis, the second lever abutting portion of the second lever abuts the second stopper forefront of the second stopper, and
when the leading-edge of the medium being transported along the medium transporting path comes in contact with the first stopper forefront of the first stopper, the first lever forefront of the first lever, the second lever forefront of the second lever, and the second stopper forefront of the second stopper, 1) the first lever rotates about the first lever rotation axis releasing the abutting of the first lever abutting portion on the first stopper forefront of the first stopper and 2) the second lever rotates about the second lever rotation axis releasing the abutting of the second lever abutting portion on the second stopper forefront of the second stopper, allowing the medium to travel to the downstream end.

5. The medium carrying device according to claim 1, further comprising a medium separation roller that separates the medium from a plurality of mediums, wherein the medium separation roller is disposed on the medium transporting path and disposed farther from the downstream end of the medium guide surface than the first lever forefront of the first lever.

6. The medium carrying device according to claim 1, further comprising a pedestal on which a medium mounting surface is disposed, wherein the medium mounting surface is disposed on the medium transporting path and disposed farther from the downstream end of the medium guide surface, and the medium is placed on the medium mounting surface.

7. The medium carrying device according to claim 1, wherein the medium transporting path comprises a diversionary path, and when a corner of the medium formed between the leading-edge and a side-edge of the medium meets a hypothetical line extending between the first stopper forefront of the first stopper and the first lever forefront of the first lever, the medium is guided to the diversionary path without waiting for the first stopper to rotate about the first stopper rotation axis to allow the medium to travel to the downstream end.

* * * * *